(12) United States Patent
Shanmugam et al.

(10) Patent No.: US 11,575,863 B2
(45) Date of Patent: Feb. 7, 2023

(54) DEPTH-BASED PROJECTION OF IMAGE-BASED CONTENT

(71) Applicant: SONY GROUP CORPORATION, Tokyo (JP)

(72) Inventors: Sankar Shanmugam, Bangalore (IN); Abilash Rajarethinam, Bangalore (IN)

(73) Assignee: SONY GROUP CORPORATION, Tokyo (JP)

( * ) Notice: Subject to any disclaimer, the term of this patent is extended or adjusted under 35 U.S.C. 154(b) by 119 days.

(21) Appl. No.: 17/225,700

(22) Filed: Apr. 8, 2021

(65) Prior Publication Data

US 2022/0329765 A1  Oct. 13, 2022

(51) Int. Cl.
*H04N 9/31* (2006.01)
*G06T 3/40* (2006.01)
*G03B 21/14* (2006.01)

(52) U.S. Cl.
CPC ......... *H04N 9/3185* (2013.01); *G06T 3/4046* (2013.01); *H04N 9/3194* (2013.01); *G03B 21/147* (2013.01); *G06T 2207/10028* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| 8,269,902 | B2 | 9/2012 | Plut |
| 9,972,131 | B2 | 5/2018 | Vaughn |
| 2013/0229396 | A1 | 9/2013 | Huebner |
| 2015/0049117 | A1 | 2/2015 | Furui |
| 2015/0062542 | A1 | 3/2015 | Appia |
| 2017/0150110 | A1 | 5/2017 | Nevo et al. |

FOREIGN PATENT DOCUMENTS

| CN | 110099267 A | * | 8/2019 | ........... H04N 9/3185 |
| CN | 110099267 A | | 8/2019 | |

* cited by examiner

*Primary Examiner* — Bao-Luan Q Le
*Assistant Examiner* — Danell L Owens
(74) *Attorney, Agent, or Firm* — Chip Law Group

(57) ABSTRACT

A projection system and method for depth-based projection of image-based content is provided. The projection system receives a sequence of image frames to be projected on a physical surface of a three-dimensional (3D) structure. The projection system controls a depth sensor to acquire depth data associated with the physical surface and feeds a first input including the acquired depth data and a first image frame of the received sequence of image frames to a neural network-based model. The projection system further receives a set of geometric correction values as a first output of the neural network-based model for the fed first input and modifies the first image frame based on the received set of geometric correction values. The projection system further controls the illumination circuitry to project the modified first image frame onto the physical surface.

20 Claims, 16 Drawing Sheets

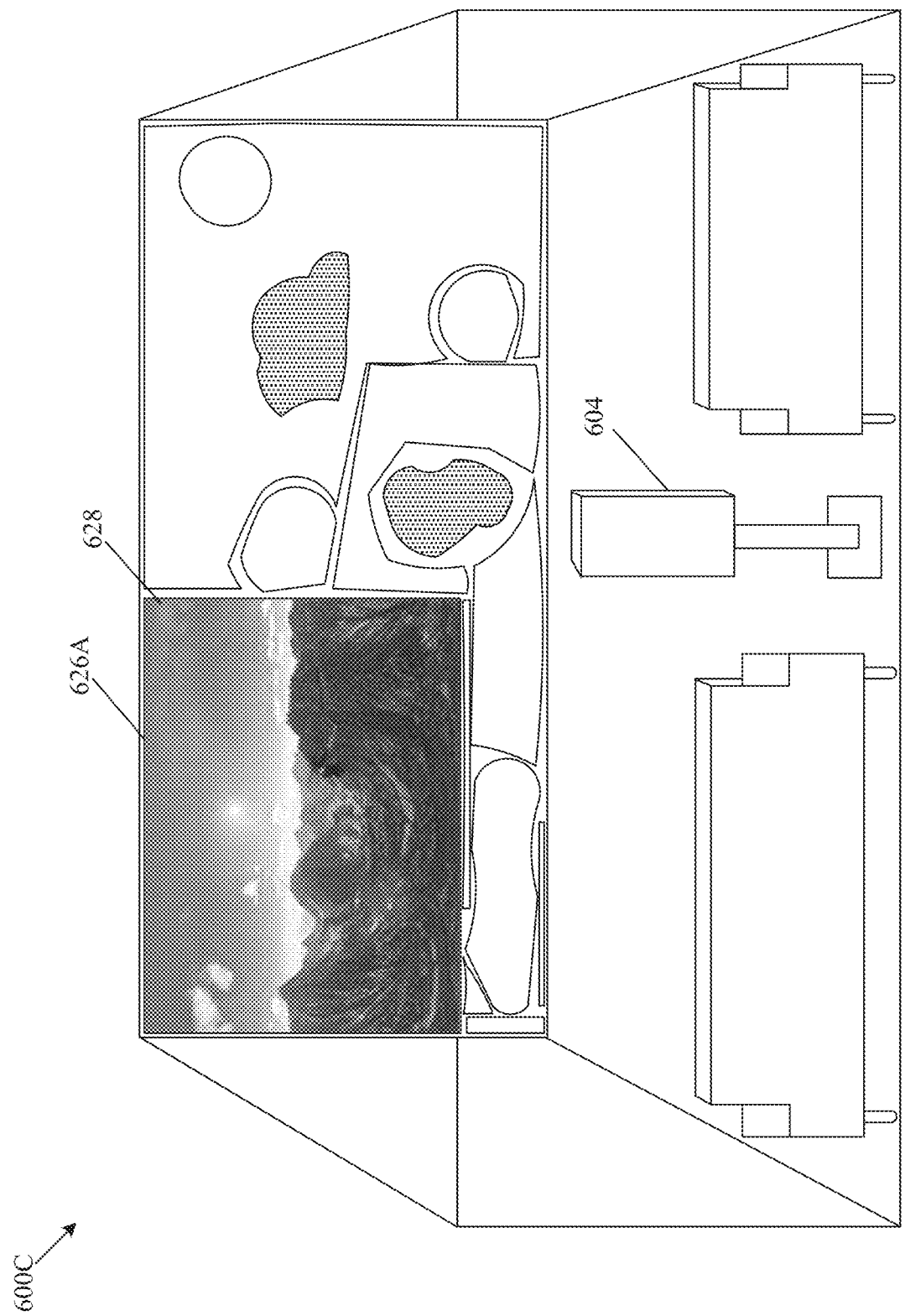

DEPTH-BASED PROJECTION OF IMAGE-BASED CONTENT

CROSS-REFERENCE TO RELATED APPLICATIONS/INCORPORATION BY REFERENCE

None.

FIELD

Various embodiments of the disclosure relate to image processing, machine learning, and image projection on a physical surface. More specifically, various embodiments of the disclosure relate to a projection system and method for depth-based projection of image-based content.

BACKGROUND

Light-based projectors (such as projectors based on digital light processing) are commonly used to project content on a physical surface (for example, a projection screen). These projectors are widely used in environments, such as meeting rooms, cinema halls, or classrooms. In some scenarios, when the physical surface is at an angle with the projector or the physical surface is not smooth or even, the shape of projected content on the physical surface appears warped or distorted. For example, if the projector is not aligned correctly with the physical surface (such as a wall), the projected content may appear trapezoidal in shape, as against an expected rectangular shape. The warping or distortions may be undesirable and unpleasant for viewers of the projected content. Typically, projectors require a manual adjustment or alignment with the physical surface to correctly project the media content on the physical surface. However, the process of manual adjustment is quite cumbersome as well as time consuming.

Limitations and disadvantages of conventional and traditional approaches will become apparent to one of skill in the art, through comparison of described systems with some aspects of the present disclosure, as set forth in the remainder of the present application and with reference to the drawings.

SUMMARY

A projection system and a method for depth-based projection of image-based content is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIG. 6C is a diagram that depicts an exemplary scenario for projection of an image frame of FIG. 6A, in accordance with an embodiment of the disclosure.

DETAILED DESCRIPTION

The following described implementations may be found in a disclosed projection system and method for depth-based projection of image-based content. The disclosed projection system includes circuitry and an image projection sub-system that may be coupled to the circuitry. The image projection sub-system may include illumination circuitry. The projection system receives a sequence of image frames to be projected on a physical surface of a three-dimensional (3D) structure and controls a depth sensor to acquire depth data associated with the physical surface. The disclosed projection system feeds an input that includes the acquired depth data and a first image frame of the received sequence of image frames to a neural network-based model and receives a set of geometric correction values, as a first output, of the neural network-based model for the fed input. The disclosed projection system modifies the first image frame based on the received set of geometric correction values and controls the illumination circuitry to project the modified first image frame onto the physical surface.

The disclosed projection system may be capable of projecting image-based content on the physical surface while maintaining a correct shape of the projection, irrespective of whether or not the projection system is correctly aligned with the physical surface. For example, the disclosed projection system may modify image frames based on geometric corrections so that the projected image frames retain the correct shape and original aspect ratio of the image frames prior to the modification. The disclosed projection system overcomes a requirement for the manual adjustment or alignment of the projector system with the physical surface.

The disclosed projection system may be also capable of classifying the physical surface into a plurality of surface portions based on a smoothness value of the physical surface. Such classifications may be used to determine a smooth surface or a largest even surface portion of the physical surface, in case the physical surface is not completely even or smooth. The projection system may project the image frames on the smooth surface or largest even surface portion of the physical surface. With such projections, the projection system may provide a pleasing projection feel for any kind of surface.

Figure 1:
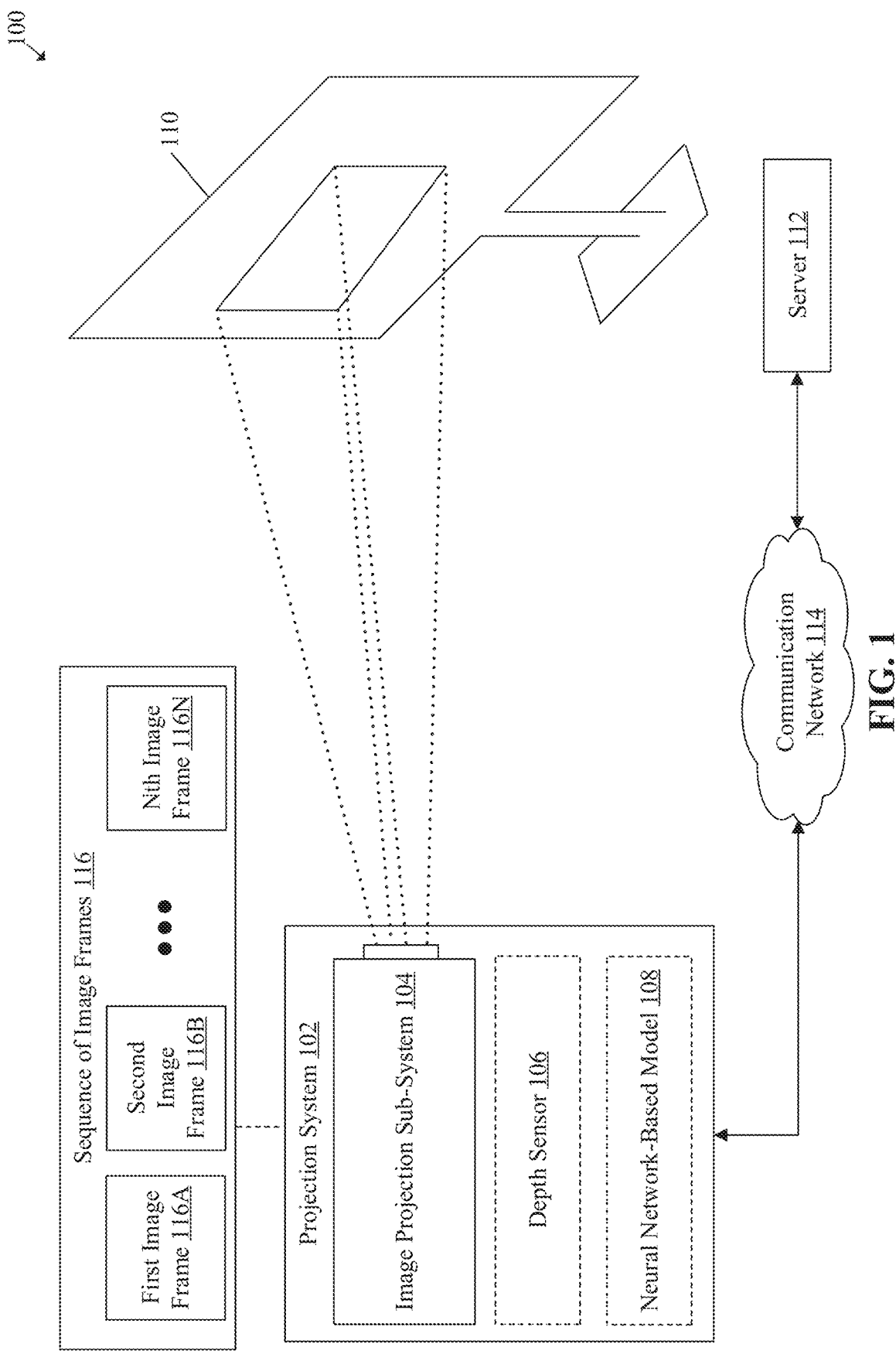
FIG. 1 is a diagram that illustrates an environment for depth-based projection of image-based content, in accordance with an embodiment of the disclosure.

FIG. 1 is a diagram that illustrates an environment for depth-based projection of image-based content, in accordance with an embodiment of the disclosure. With reference to FIG. 1, there is shown a diagram of a network environment 100. The network environment 100 includes a projection system 102 that includes an image projection sub-system 104 and a depth sensor 106. With reference to FIG. 1, there is further shown a neural network-based model 108, a physical surface 110, a server 112, and a communication network 114. There is further shown a sequence of image frames 116 that may be projected on the physical surface 110.

The projection system 102 may include suitable logic, circuitry, interfaces, and/or code that may be configured to receive the sequence of image frames 116, modify each of the received sequence of image frames 116 based on an output of the neural network-based model 108, and control the image projection sub-system 104 to project the each of modified image frames onto the physical surface 110. The output of the neural network-based model 108 may include geometric corrections (for example, keystone correction values) applicable on the sequence of the image frames 116. In an embodiment, the projection system 102 may be an electronic device that may be integrated into a light-based projector (such as a DLP projector) so as to remove the need of cumbersome process of manual adjustment of the light-based projector. In another embodiment, the projection system 102 may be external to and communicatively coupled to the light-based projector, which any user may use to for calibration/alignment with the projection surface. Examples of the projection system 102 may include, but are not limited to, an overhead or a mountable projector, a Pico projector, a Digital Light Processing (DLP) projector, a mainframe machine, a computer work-station, a smartphone, a cellular phone, a mobile phone, a wearable electronic device, a head-mounted device, a gaming device, a server, a consumer electronic (CE) device, a computing device, and/or any other device with projection features.

In FIG. 1, the image projection sub-system 104 is shown as part of the projection system 102. However, the disclosure may not be so limiting, and in some embodiments, the image projection sub-system 104 may be external to and communicatively coupled to the projection system 102.

The image projection sub-system 104 may include suitable logic, circuitry, interfaces, and/or code that may be configured to project the each of modified image frames (or each of the received sequence of image frames 116) onto the physical surface 110. In an embodiment, the image projection sub-system 104 may be separate from the projection system 102 and may communicate with the projection system 102, via the communication network 114. Examples of the image projection sub-system 104 may include, but are not limited to, a cathode ray tube projection unit, a laser or (Light Emitting Diode) LED-based circuitry, a liquid crystal-based projection unit, an optical projection unit (includes a lens assembly and an illumination unit (with light-source and a driver), and other ancillary devices/sensors), a digital light processing projection unit, a smartphone, a cellular phone, a mobile computer, a gaming device, a consumer electronic (CE) device and/or any other device with image projection capabilities.

The depth sensor 106 may include suitable logic, circuitry, and interfaces that may be configured to capture depth data associated with the physical surface 110. The depth data may include depth values, each of which may be a measure of a distance (for example, a relative distance) between the depth sensor 106 and a corresponding point on the physical surface 110.

The neural network-based model 108 may be a computational network or a system of artificial neurons, arranged in a plurality of layers, as nodes. The plurality of layers of the neural network-based model 108 may include an input layer, one or more hidden layers, and an output layer. Each layer of the plurality of layers may include one or more nodes (or artificial neurons, represented by circles, for example). Outputs of all nodes in the input layer may be coupled to at least one node of hidden layer(s). Similarly, inputs of each hidden layer may be coupled to outputs of at least one node in other layers of the neural network-based model 108. Outputs of each hidden layer may be coupled to inputs of at least one node in other layers of the neural network-based model 108. Node(s) in the final layer may receive inputs from at least one hidden layer to output a result. The number of layers and the number of nodes in each layer may be determined from hyper-parameters of the neural network-based model 108. Such hyper-parameters may be set before, while training, or after training the neural network-based model 108 on a training dataset.

Each node of the neural network-based model 108 may correspond to a mathematical function (e.g., a sigmoid function or a rectified linear unit) with a set of parameters, tunable during training of the network. The set of parameters may include, for example, a weight parameter, a regularization parameter, and the like. Each node may use the mathematical function to compute an output based on one or more inputs from nodes in other layer(s) (e.g., previous layer(s)) of the neural network-based model 108. All or some of the nodes of the neural network-based model 108 may correspond to same or a different same mathematical function.

In training of the neural network-based model 108, one or more parameters of each node of the neural network-based model 108 may be updated based on whether an output of the final layer for a given input (from the training dataset) matches a correct result based on a loss function for the neural network-based model 108. The above process may be repeated for same or a different input until a minima of loss function is achieved, and a training error is minimized. Several methods for training are known in art, for example, gradient descent, stochastic gradient descent, batch gradient descent, gradient boost, meta-heuristics, and the like.

The neural network-based model 108 may include electronic data, which may be implemented as, for example, a software component of an application executable on the projection system 102. The neural network-based model 108 may rely on libraries, external scripts, or other logic/instructions for execution by a processing device, such as circuitry. The neural network-based model 108 may include code and routines configured to enable a computing device, such as circuitry to perform one or more operations for generation of the set of geometric correction values. Additionally, or alternatively, the neural network-based model 108 may be implemented using hardware including a processor, a microprocessor (e.g., to perform or control performance of one or more operations), a field-programmable gate array (FPGA), or an application-specific integrated circuit (ASIC). Alternatively, in some embodiments, the neural network-based model 108 may be implemented using hardware, software, or a combination of hardware and software.

Examples of the neural network-based model 108 may include, but are not limited to, a convolutional neural network (CNN), an artificial neural network (ANN), a deep neural network (DNN), a fully connected neural network, and/or a combination of such networks. In an embodiment, the neural network-based model 108 may be a hybrid network of one or more variants (for example, CNN-ANN) of a DNN.

The physical surface 110 may be a surface of a three-dimensional (3D) structure on which the sequence of image frames 116 may be projected. The physical surface 110 may be fixed (i.e. permanently installed) or mobile (i.e. portable). Examples of the physical surface 110 may include, but are not limited to, an electric projector screens, a manual projector screens, a tripod projector screens, a fixed frame screens, a floor rising projector screens, a wall with paint, a fabric, an inflatable projector screens, a projector screen paint, and any electronic device with projection features.

The server 112 may include suitable logic, circuitry, and interfaces, and/or code that may be configured to store the sequence of image frames 116. The server 112 may be also configured to train and store the neural network-based model 108. In one embodiment, the server 112 may be implemented as a cloud server and may execute operations through web applications, cloud applications, HTTP requests, repository operations, file transfer, and the like. Other example implementations of the server 112 may include, but are not limited to, a database server, a file server, a web server, a media server, an application server, a mainframe server, or a cloud computing server. In an embodiment, the server 112 may be implemented as a plurality of distributed cloud-based resources by use of several technologies that are well known to those ordinarily skilled in the art.

The communication network 114 may include a communication medium through which the projection system 102 and the server 112 may communicate with each other. The communication network 114 may be one of a wired connection or a wireless connection. Examples of the communication network 114 may include, but are not limited to, the Internet, a cloud network, a Wireless Fidelity (Wi-Fi) network, a Personal Area Network (PAN), 4th Generation or 5th Generation mobile wireless network, a Local Area Network (LAN), or a Metropolitan Area Network (MAN). Various devices in the network environment 100 may be configured to connect to the communication network 114 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the projection system 102 may be configured to receive the sequence of image frames 116. In an embodiment, the projection system 102 may receive an analog video signal (for example, YPbPr video) from an external data source (for example, High-Definition Television (HDTV) tuners, set top boxes, Standard Definition (SD) and HD Disks, personal computers, or workstations) and may digitize the analog video signal to obtain the sequence of image frames 116 (which may be a digital video). In another embodiments, the projection system 102 may receive the sequence of image frames 116 from the server 112, via the communication network 114. The received sequence of image frames 116 may include, for example, a first image frame 116A, a second image frame 116B, . . . , and an Nth image frame 116N.

The projection system 102 may be configured to control the depth sensor 106 to acquire the depth data associated with the physical surface 110. The acquired depth data may include depth values that indicate the distance of the physical surface 110 from the projection system 102 and/or the image projection sub-system 104.

The projection system 102 may be further configured to feed a first input to the neural network-based model 108. The first input may include, for example, the acquired depth data and the first image frame 116A of the sequence of image frames 116. The projection system 102 may receive a set of geometric correction values as a first output of the neural network-based model 108 for the fed first input. The received set of geometric correction values may include, for example, a set of digital keystone correction values. In an embodiment, the received set of geometric correction values may also include coordinate values that may be used to resize the first image frame 116A.

The projection system 102 may be further configured to modify the first image frame 116A based on the received set of geometric correction values. For example, the projection system 102 may be configured to resize and/or warp the first image frame 116A in such a way that the modified first image frame 116A, when projected on the physical surface 110, appears rectangular in shape irrespective of any misalignment between the projection system 102 and the physical surface 110. The projection system 102 may transmit the modified first image frame to the image projection sub-system 104 and may control the image projection sub-system 104 to project the modified first image frame onto the physical surface 110.

In FIG. 1, the neural network-based model 108 is shown as part of the projection system 102; however, the disclosure may not be so limiting and in some embodiments, the neural network-based model 108 may be deployed on a cloud server, separate from the projection system 102, without departing from the scope of the disclosure. Also, in FIG. 1, the image projection sub-system 104 is shown to be integrated within the projection system 102; however, the disclosure may not be so limiting. In some embodiments, the image projection sub-system 104 may be separate from the projection system 102, without departing from the scope of the disclosure.

Figure 2:
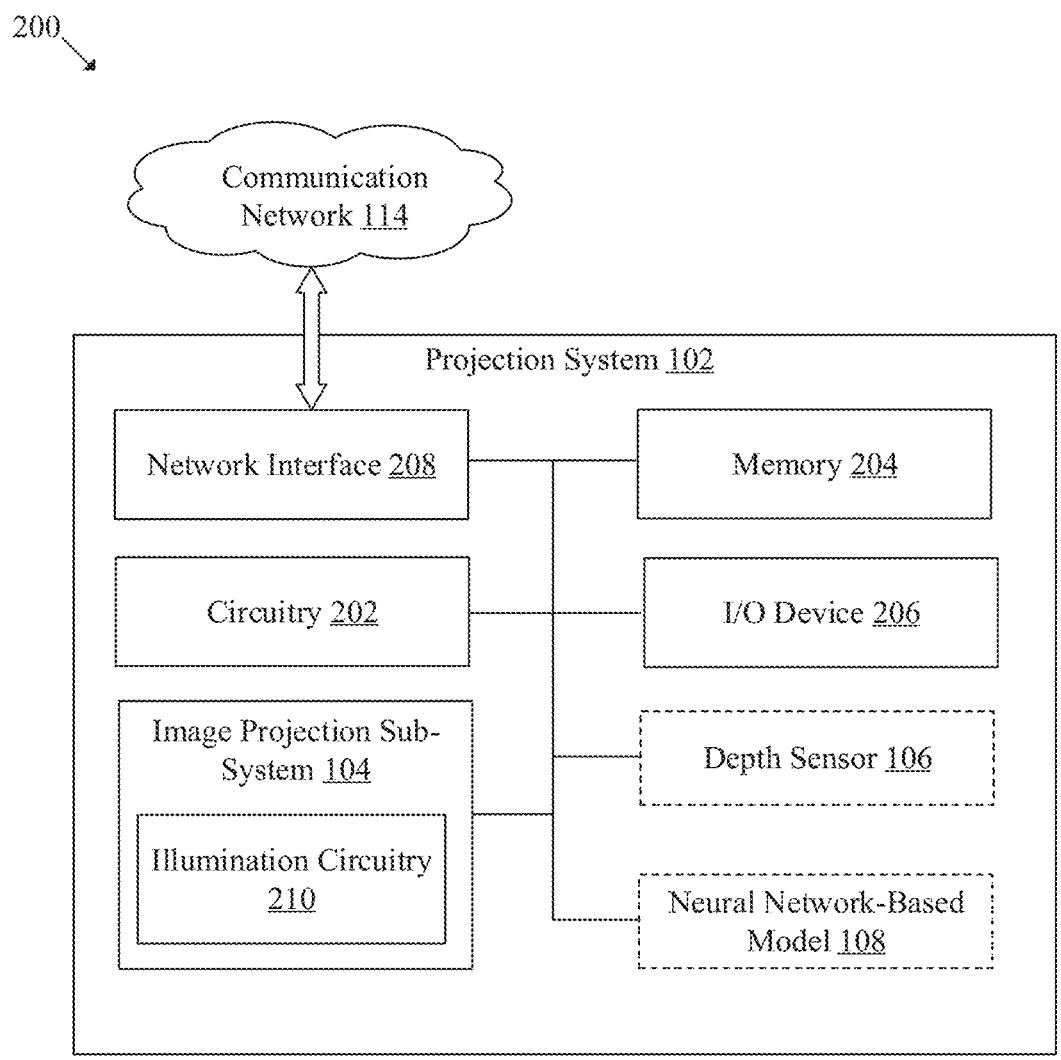
FIG. 2 is an exemplary block diagram of the projection system of FIG. 1, in accordance with an embodiment of the disclosure.

FIG. 2 is an exemplary block diagram of the projection system of FIG. 1, in accordance with an embodiment of the disclosure. FIG. 2 is explained in conjunction with elements from FIG. 1. With reference to FIG. 2, there is shown a block diagram 200 of the projection system 102. The projection system 102 may include circuitry 202, a memory 204, an input/output (I/O) device 206, and a network interface 208. With reference to FIG. 2, there is further shown a depth sensor 106 and the neural network-based model 108. There is further shown the image projection sub-system 104 that may include the illumination circuitry 210. The circuitry 202 may be communicatively coupled to the memory 204, the I/O device 206, the network interface 208, and the image projection sub-system 104.

In an embodiment, the circuitry 202 may be external to and communicatively coupled to the image projection sub-system 104. In such a case, the image projection sub-system 104 may be external to (i.e. not integrated into) the projection system 102. In another embodiment, the circuitry 202 may be internal to and communicatively coupled to the image projection sub-system 104. In such a case, the image projection sub-system 104 may be internal to (i.e. integrated into) the projection system 102.

The circuitry 202 may include suitable logic, circuitry, and interfaces that may be configured to execute instructions stored in the memory 204. The executed instructions may correspond to, for example, a set of image processing operations for modification of the first image frame 116A and a control of the illumination circuitry 210 for projection of the modified first image frame on the physical surface 110. The circuitry 202 may be implemented based on a number of processor technologies known in the art. Examples of the circuitry 202 may include, but are not limited to, a Graphical Processing Unit (GPU), a co-processor, a Central Processing Unit (CPU), x86-based processor, a Reduced Instruction Set Computing (RISC) processor, an Application-Specific Integrated Circuit (ASIC) processor, a Complex Instruction Set Computing (CISC) processor, and a combination thereof.

The memory 204 may include suitable logic, circuitry, and/or interfaces that may be configured to store the instructions executable by the circuitry 202. Additionally, the memory 204 may store the sequence of image frames 116 and the set of geometric correction values. In at least one embodiment, the memory 204 may store the neural network-based model 108 and the acquired depth data. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, and/or interfaces that may be configured to act as an interface between a user of the projection system 102 and the projection system 102. The I/O device 206 may be configured to receive the sequence of image frames 116. The I/O device 206 may comprise various input and output devices, which may be configured to communicate with different operational components of the projection system 102. Examples of the I/O device 206 may include, but are not limited to, a touch screen, a keyboard, a mouse, a joystick, a microphone, and a display screen.

The network interface 208 may include suitable logic, circuitry, interfaces, and/or code that may be configured to establish communication between the projection system 102, and the server 112, via the communication network 114. The network interface 208 may be configured to implement known technologies to support wired or wireless communication. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 208 may be configured to communicate via offline and online wireless communication with networks, such as the Internet, an Intranet, and/or a wireless network, such as a cellular telephone network, a wireless local area network (WLAN), personal area network, and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), Long-Term Evolution (LTE), 5th Generation New Radio (5G NR), time division multiple access (TDMA), Bluetooth, Wireless Fidelity (Wi-Fi) (such as IEEE 802.11, IEEE 802.11b, IEEE 802.11g, IEEE 802.11n, and/or any other IEEE 802.11 protocol), voice over Internet Protocol (VoIP), Wi-MAX, Internet-of-Things (IoT) technology, Machine-Type-Communication (MTC) technology, a protocol for email, instant messaging, and/or Short Message Service (SMS).

The illumination circuitry 210 may include suitable logic, circuitry, and interfaces that may be configured to project each of the modified sequence of image frames 116 on the physical surface 110. In an embodiment, the illumination circuitry 210 may include a light source (for example, a laser or a set of light emitting diodes (LEDs), such as RGB LEDs) and a driver circuit coupled to the light source and the circuitry 202. The circuitry 202 may control the driver circuit to operate the light source (based on content that may need to be projected). In an embodiment, the illumination circuitry 210 may also include a spatial light modulator (such as a Liquid crystal on Silicon (LCoS) panel).

The functions or operations executed by the projection system 102, as described in FIG. 1, may be performed by the circuitry 202. Operations executed by the circuitry 202 are described in detail, for example, in FIGS. 3A, 3B, 4A, 4B, 5A, 5B, 5C, 6A, 6B, 6C, 7, 8, 9, and 10.

Figure 3A:
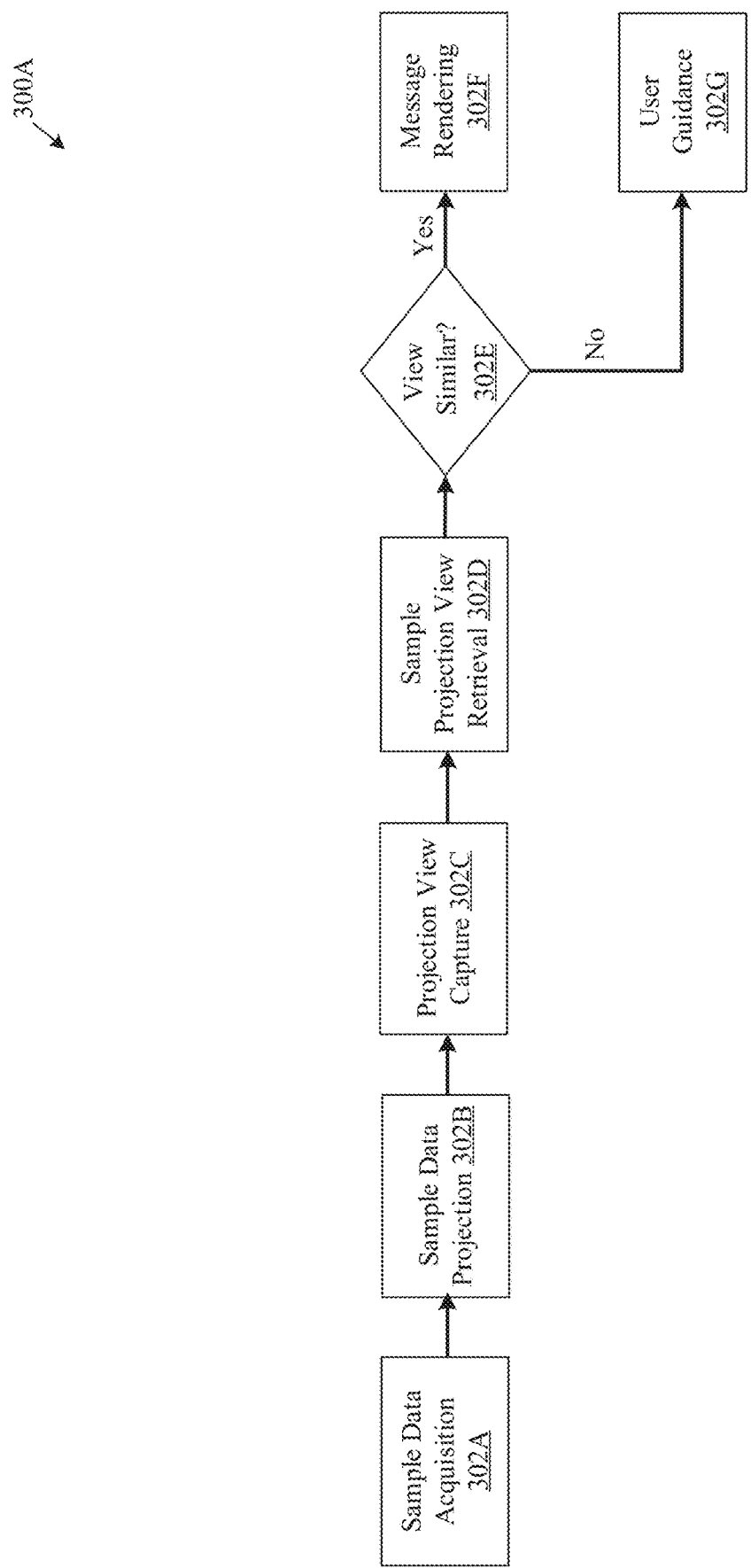
FIG. 3A is a diagram that illustrates exemplary operations for calibration of the projection system 102 of FIG. 1, in accordance with an embodiment of the disclosure.

FIG. 3A is a diagram that illustrates exemplary operations for calibration of the projection system 102 of FIG. 1, in accordance with an embodiment of the disclosure. FIG. 3A is explained in conjunction with elements from FIGS. 1 and 2. With reference to FIG. 3A, there is shown a block diagram 300A that illustrates exemplary operations from 302A to 302G, as described herein. The exemplary operations illustrated in the block diagram 300A may start at 302A and may be performed by any computing system, apparatus, or device, such as by the projection system 102 of FIG. 1 or FIG. 2. Although illustrated with discrete blocks, the exemplary operations associated with one or more blocks of the block diagram 300A may be divided into additional blocks, combined into fewer blocks, or eliminated, depending on the particular implementation. The set of operations as shown in the block diagram 300A may be performed at a pre-initialization stage (for example, before content may be projected on the physical surface 110) for the calibration of the projection system 102.

At 302A, a sample data acquisition operation may be performed. In the sample data acquisition operation, the circuitry 202 may be configured to receive a sample image frame for projection on the physical surface 110. In an embodiment, the sample image frame may be extracted from a digital video signal produced by an analog to digital video converter or may be retrieved from the memory 204 of the projection system 102 or the server 112.

At 302B, a sample data projection operation may be performed. In the sample data projection operation, the circuitry 202 may be configured to project the sample image frame onto the physical surface 110. In an embodiment, the circuitry 202 may control the illumination circuitry 210 to project the sample image frame onto the physical surface 110.

At 302C, a projection view capture operation may be performed. In the projection view capture operation, the circuitry 202 may be configured to capture a projection view of the sample image frame. Specifically, the circuitry 202 may be configured to determine corners of the projected sample image frame and store corresponding co-ordinates of each determined corner in the memory 204 of the projection system 102.

At 302D, a sample projection view retrieval operation may be performed. In the sample projection view retrieval operation, the circuitry 202 may be configured to retrieve a sample projection view of a random image frame. The sample projection view may be an optimal (as well as desirable) view for projection of any image frame, projected onto the physical surface 110. By way of example, and not limitation, the sample projection view may be rectangular in shape and the center of the sample projection view may be same as the center of the physical surface 110.

At 302E, it may be determined whether or not the captured projection view and the sample projection view are similar. Specifically, it may be determined whether or not the captured projection view matches with the sample projection view. The circuitry 202 may compare the stored co-ordinates of the corners of the captured projection view with the co-ordinates of the corners of the sample projection view. In case the captured projection view and the sample projection view are similar (or same), control may pass to 302F. Otherwise, the control may pass to 302G.

At 302F, a message rendering operation may be performed. In the message rendering operation, the circuitry 202 may be configured to render a message on the physical surface 110 and/or on a user device associated with the user of the projection system 102. The rendered message may be indicative of a successful calibration of the projection system 102. After rendering of the message, the pre-initialization stage of the projection system 102 may be considered to be completed and the circuitry 202 may switch the projection system 102 from the pre-initialization stage to an operational stage.

At 302G, a user guidance operation may be performed. In the user guidance operation, the circuitry 202 may render a set of instructions on the physical surface 110 and/or the user device to assist the user to perform one or more operations to calibrate the projection system 102. For example, the circuitry 202 may control a motion of the projection system 102 so that the plane of projection of the projection system 102 is aligned with the physical surface 110. After the one or more operations are performed, the circuitry 202 may receive a user input indicative of a completion of the one or more operations by the user. Based on the user input, the circuitry 202 may be configured to execute the set of operations from 302A to 302F (or 302G) again to check whether the captured projection view and the sample projection view are similar (or same) or not. This process may be repeated until the projection system 102 is calibrated successfully. Details about user guidance operation are provided, for example, in FIG. 3B.

Figure 3B:
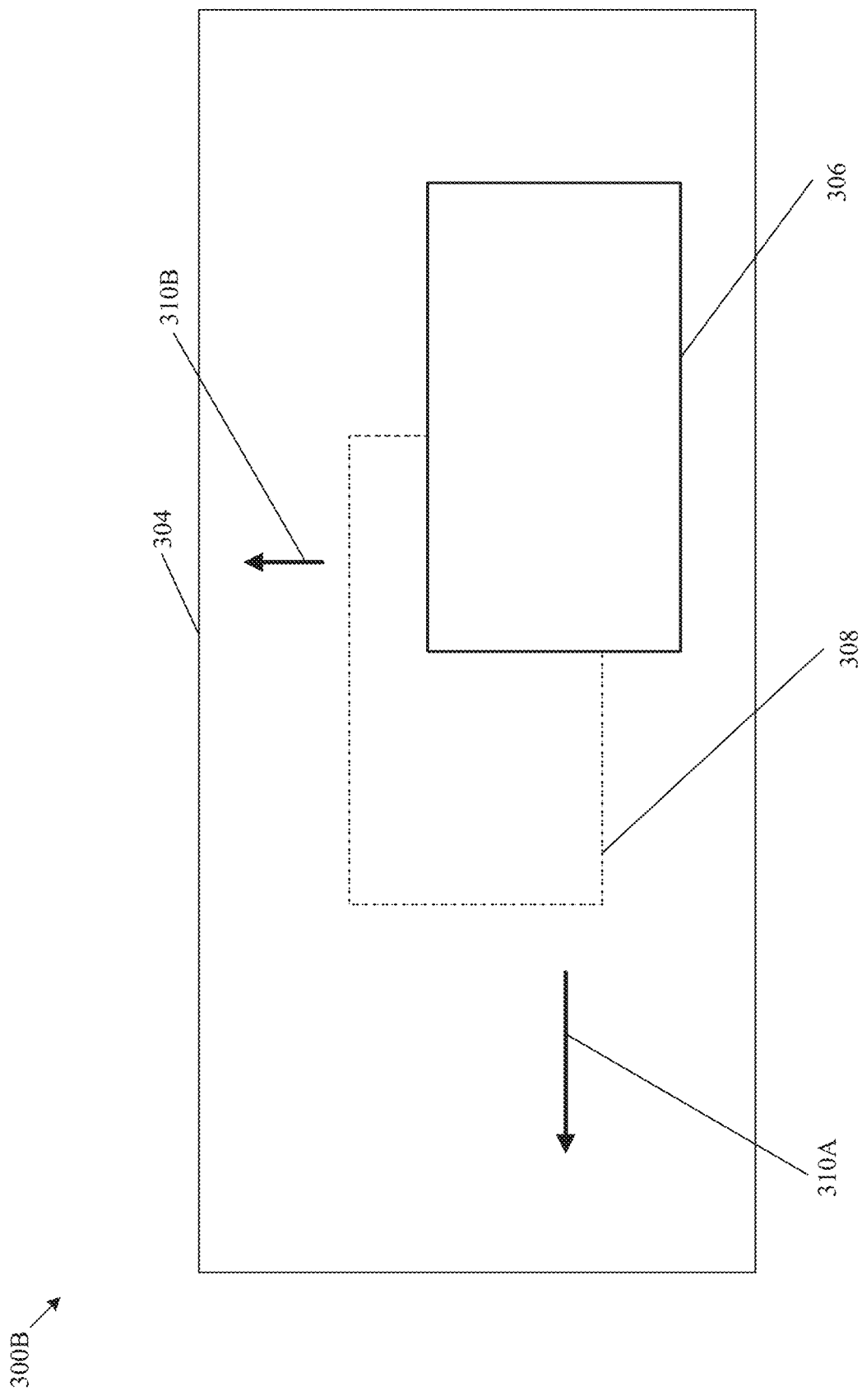
FIG. 3B is a diagram that depicts an exemplary scenario for user guidance to calibrate the projection system 102 of FIG. 1, in accordance with an embodiment of the disclosure.

FIG. 3B is a diagram that depicts an exemplary scenario for user guidance to calibrate the projection system 102 of FIG. 1, in accordance with an embodiment of the disclosure. FIG. 3B is explained in conjunction with elements from FIGS. 1, 2, and 3A. With reference to FIG. 3B, there is shown an exemplary scenario 300B. There is further shown a physical surface 304 of a three-dimensional (3D) structure. With reference to FIG. 3B, there is further shown a captured projection view 306 and a sample projection view 310 on the physical surface 304.

The circuitry 202 may compare the captured projection view 306 with the sample projection view 310 to determine whether the co-ordinates of the corners of the captured projection view 306 are similar to (or same as) the co-ordinates of the corners of the sample projection view 310. As discussed at 302E of FIG. 3A, if the captured projection view 306 is not similar to (or same as) the sample projection view 310, the circuitry 202 may render a set of instructions on the physical surface 304. In an embodiment, the set of instructions may include a first arrow 310A and a second arrow 310B.

As depicted, the set of instructions (that include the first arrow 310A and the second arrow 310B) may assist the user to move the projection system 102 to the left side (i.e. a first operation) and to raise the height of the projection system 102 (i.e. a second operation). After the projection system 102 is moved to the left side and the height of the projection system 102 is raised (i.e. after the set of operations are performed), the circuitry 202 may receive the user input that may indicate the completion of the set of operations, included in the set of instructions. Based on the received user input, the circuitry 202 may execute the set of operations from 302A to 302F (or 302G) to check whether the projection system 102 is calibrated or not.

It should be noted that the first arrow 310A and the second arrow 310B shown in FIG. 3B are presented merely as an example of the set of instructions. The present disclosure may be applicable to scenarios where the set of instructions may be rendered as textual instructions or audio instructions via an audio output device. The description of such instructions has been omitted from the disclosure for the sake of brevity.

Figure 4A:
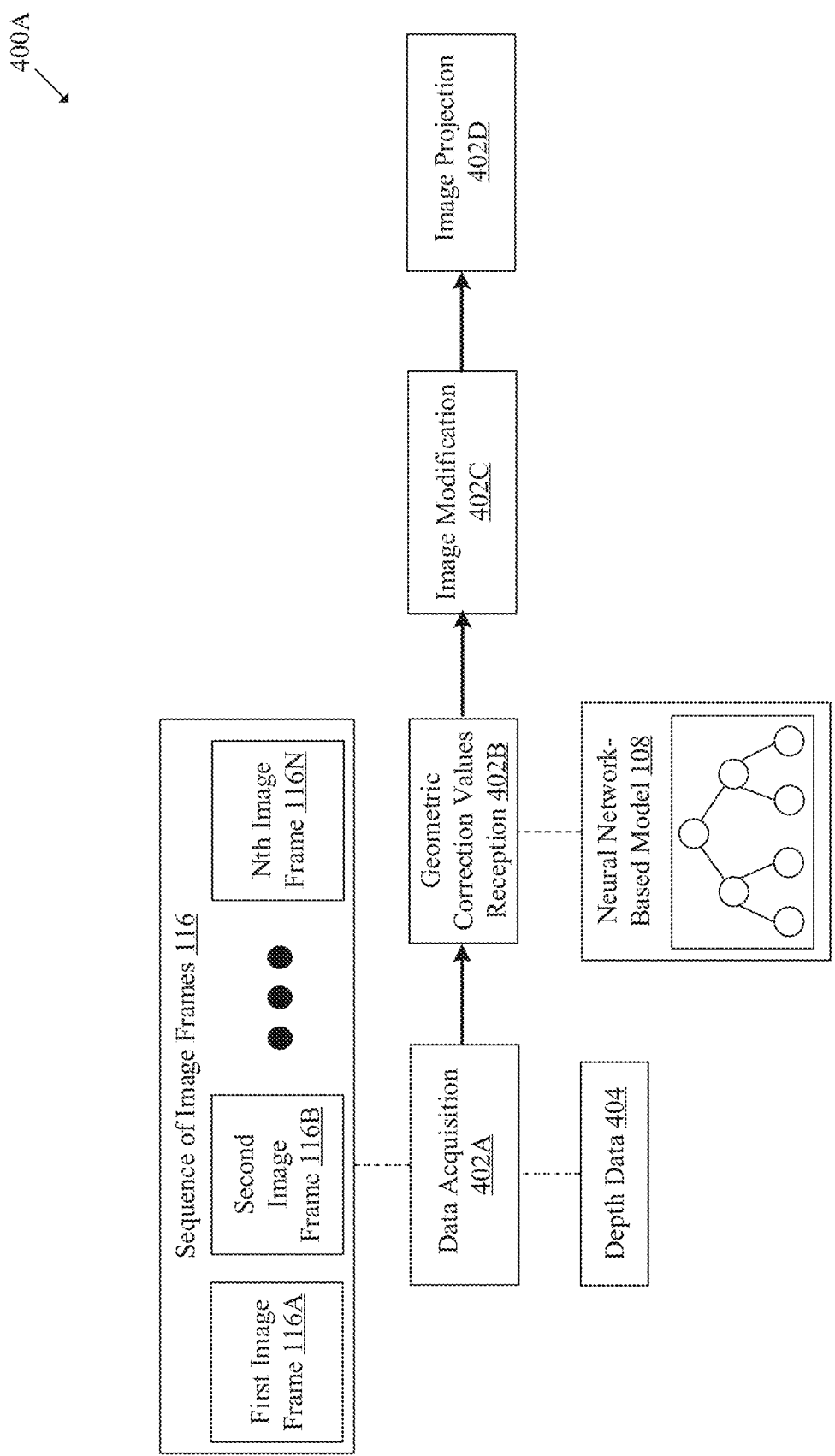
FIG. 4A is a diagram that illustrates exemplary operations for depth-based projection of image-based content, in accordance with an embodiment of the disclosure.

FIG. 4A is a diagram that illustrates exemplary operations for depth-based projection of image-based content, in accordance with an embodiment of the disclosure. FIG. 4A is explained in conjunction with elements from FIGS. 1, 2, 3A, and 3B. With reference to FIG. 4A, there is shown a block diagram 400A that illustrates exemplary operations from 402A to 402D, as described herein. The exemplary operations illustrated in the block diagram 400A may start at 402 and may be performed by any computing system, apparatus, or device, such as by the projection system 102 of FIG. 1 or FIG. 2. Although illustrated with discrete blocks, the exemplary operations associated with one or more blocks of the block diagram 400A may be divided into additional blocks, combined into fewer blocks, or eliminated, depending on the particular implementation.

At 402A, a data acquisition operation may be performed. In the data acquisition operation, the circuitry 202 may receive the sequence of image frames 116 to be projected on the physical surface 110 of a three-dimensional (3D) structure. The sequence of image frames 116 may be projected on the physical surface 110 in the same sequence in which the sequence of image frames 116 is received.

In the data acquisition operation, the circuitry 202 may be further configured to control the depth sensor 106 to acquire depth data 404 associated with the physical surface 110. In an embodiment, the depth data 404 may include a depth map associated with the physical surface 110. The depth map may be an image or image channel that may include information related to the distance of the physical surface 110 from the projection system 102.

At 402B, geometric correction values may be generated. The circuitry 202 may be configured to generate a set of geometric correction values for modification of the first image frame 116A. To generate the set of geometric correction values, the circuitry 202 may be configured to feed a first input to the neural network-based model 108. The fed first input may include the acquired depth data 404 and the first image frame 116A of the received sequence of image frames 116. The acquired depth data 404 may be a depth map of the physical surface 110, for example. In an embodiment, the neural network-based model 108 may be a pre-trained model that may be trained on to output the geometric correction values for each image frame of the sequence of image frames 116. Details about training of the neural network-based model 108 are provided, for example, in FIG. 9.

Based on the fed first input, the circuitry 202 may be configured to receive a first output from the neural network-based model 108. The received first output may include a set of geometric correction values for the first image frame 116A. In an embodiment, the set of geometric correction values may include, for example, keystone correction values or a geometric correction value for each side of the first image frame 116A.

At 402C, an image modification operation may be performed. In the image modification operation, the circuitry 202 may be configured to modify the first image frame 116A based on the received set of geometric correction values. In an embodiment, the modification of the first image frame 116A may include application of an image warping operation on the first image frame 116A while maintaining an aspect ratio of the first image frame 116A. If the projection system 102 is at an angle with respect to the physical surface 110, then the image warping operation may be used to apply geometry error correction to the first image frame 116A so that the first image frame 116A (after the modification) appears to be correct on the physical surface 110 and retains the aspect ratio of the first image frame 116A (before the modification).

At 402D, a first image projection operation may be performed. In the first image projection operation, the circuitry 202 may be configured to control the illumination circuitry 210 to project the modified first image frame on the physical surface 110. The projection of the modified first image frame may remain rectangular in shape irrespective of projectable surface nature and the angle of the projection system 102 to the physical surface 110.

Figure 4B:
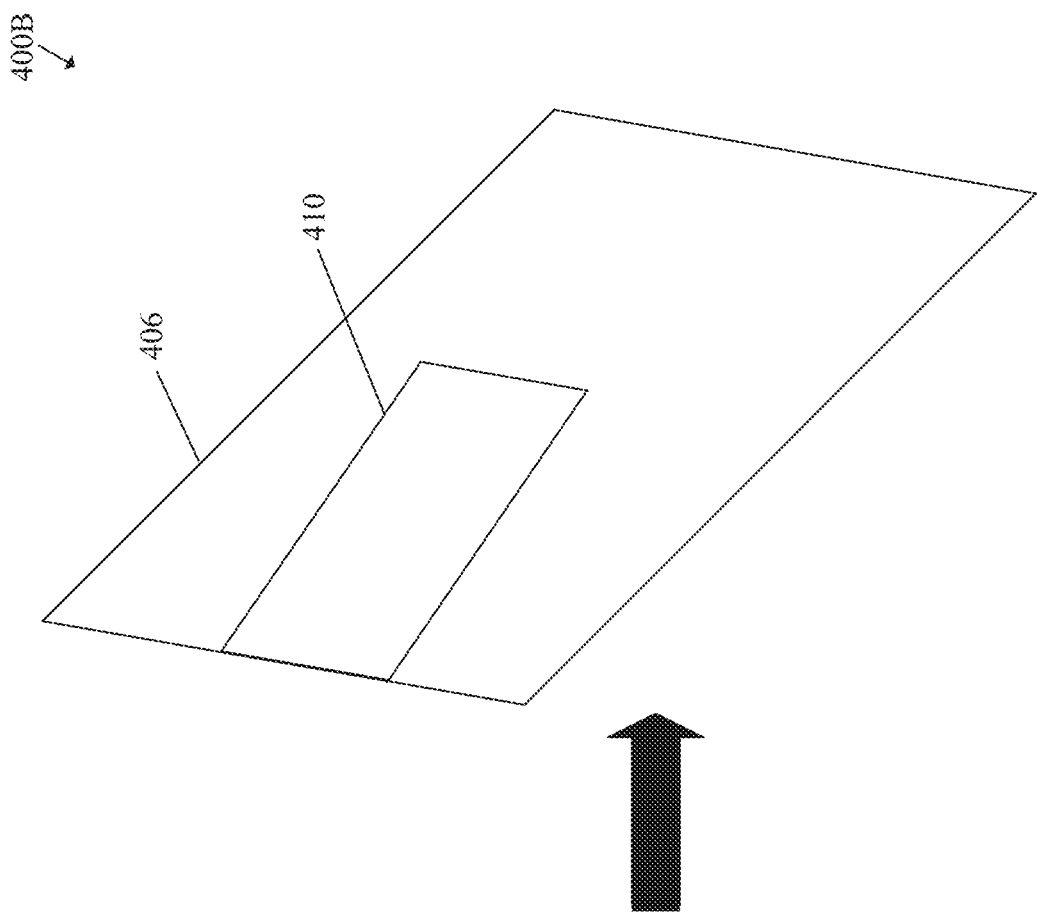
FIG. 4B is a diagram that depicts an exemplary scenario of a first image frame and a modified first image frame projected onto a physical surface, in accordance with an embodiment of the disclosure.
Figure 4B:
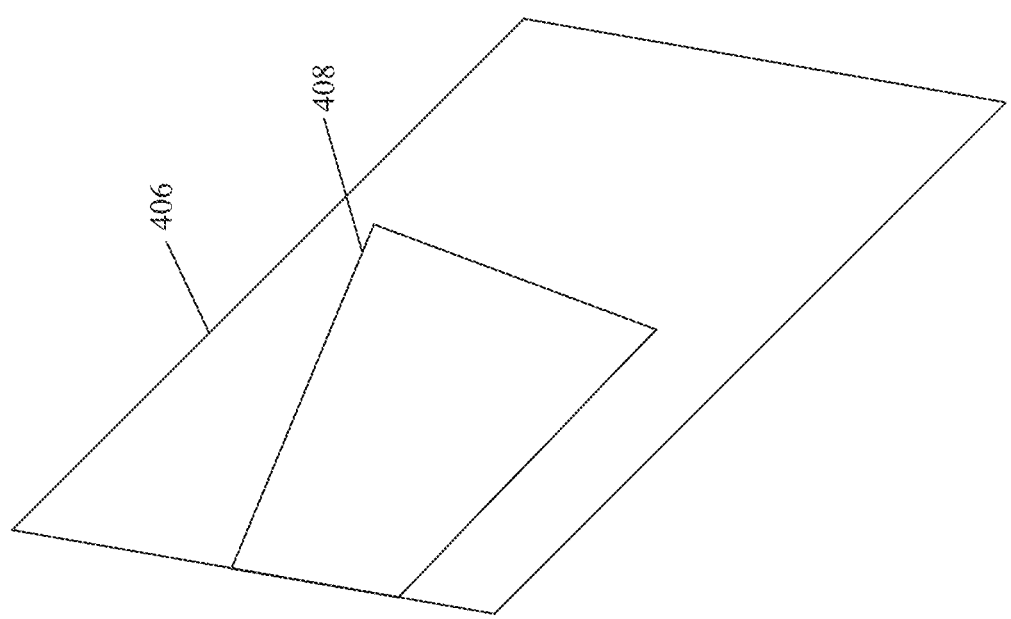

FIG. 4B is a diagram that depicts an exemplary scenario of a first image frame and a modified first image frame projected onto a physical surface, in accordance with an embodiment of the disclosure. With reference to FIG. 4B, there is shown an exemplary scenario 400B. There is further shown a physical surface 406 of a three-dimensional (3D) structure, for example, a wall. With reference to FIG. 4B, there is further shown a first image frame 408 and a modified first image frame 410 projected on the physical surface 406.

In an embodiment, the circuitry 202 may receive the first image frame 408. After the reception of the first image frame 408, the circuitry 202 may control the illumination circuitry 210 to project the received first image frame 408 onto the physical surface 406. As shown, the first image frame 408, when projected onto the physical surface 406, may be trapezoidal in shape. Such projection of the first image frame 408 may be undesirable or inconvenient for the audience. To rectify the shape of the projection, the circuitry 202 may be configured to modify the first image frame 408 based on a set of geometric correction values to generate the modified first image frame 410. The circuitry 202 may further control the illumination circuitry 210 to project the modified first image frame 410 onto the physical surface 406. As shown, the modified first image frame 410, when projected onto the physical surface 406 may be rectangular in shape. Such projection may be desirable for the audience. Details related to the set of geometric correction values and the modification are provided, for example, in FIGS. 4A, 5A, 5B, 5C, 7, 9, and 10.

Figure 5A:
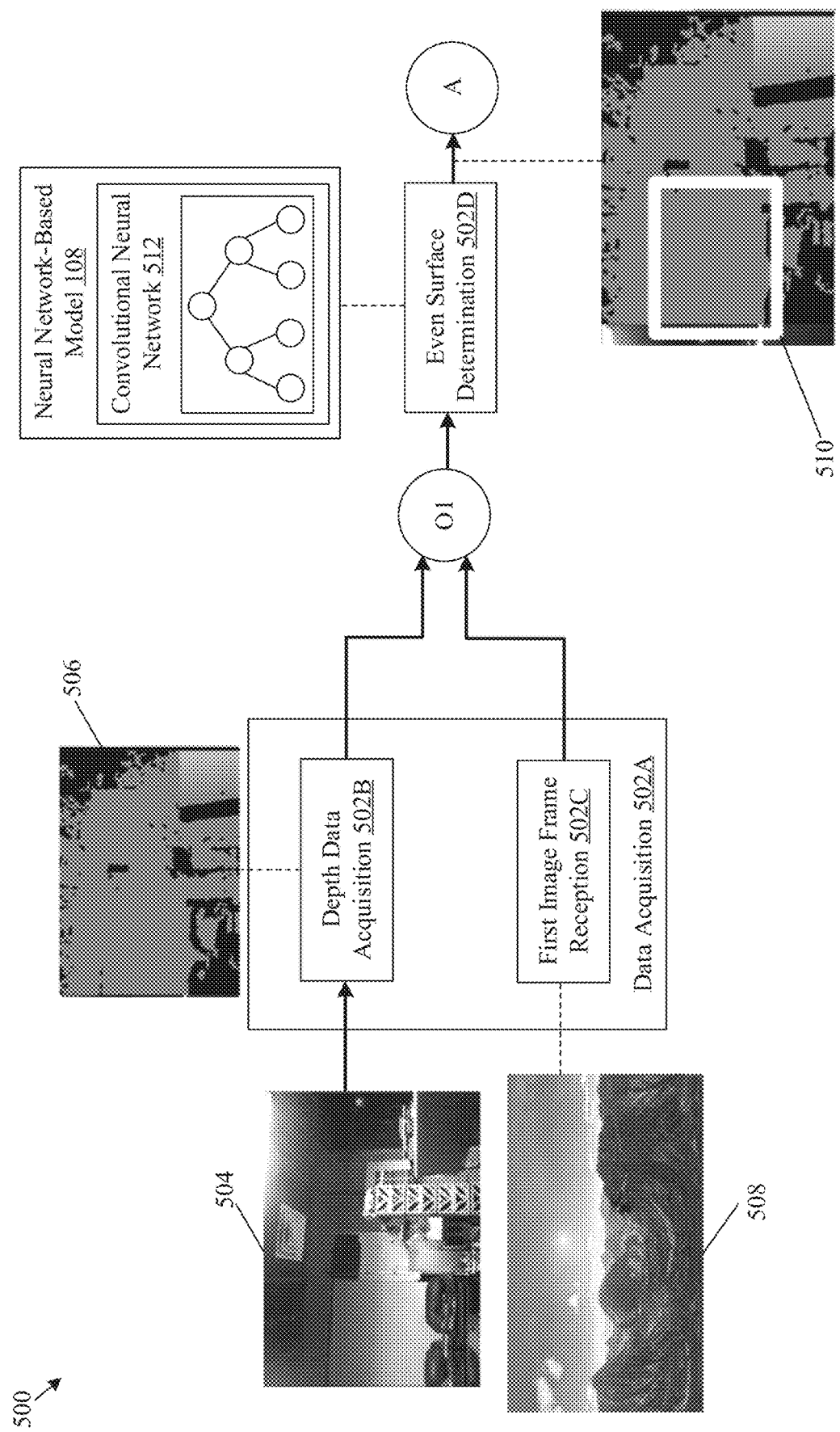
FIGS. 5A, 5B, and 5C are diagrams that collectively illustrate exemplary operations for depth-based projection of image-based content on an uneven surface, in accordance with an embodiment of the disclosure.
Figure 5B:
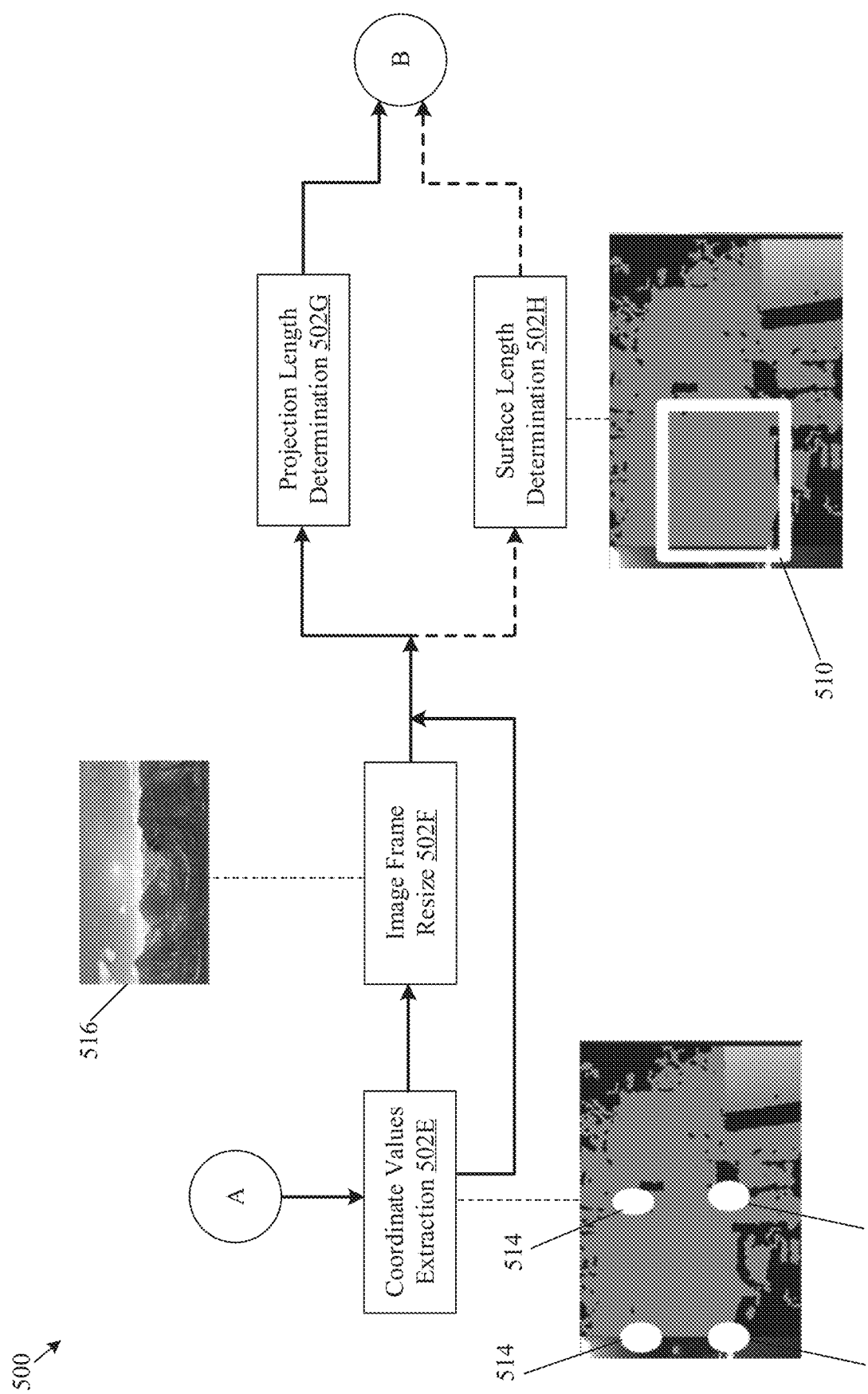
Figure 5C:
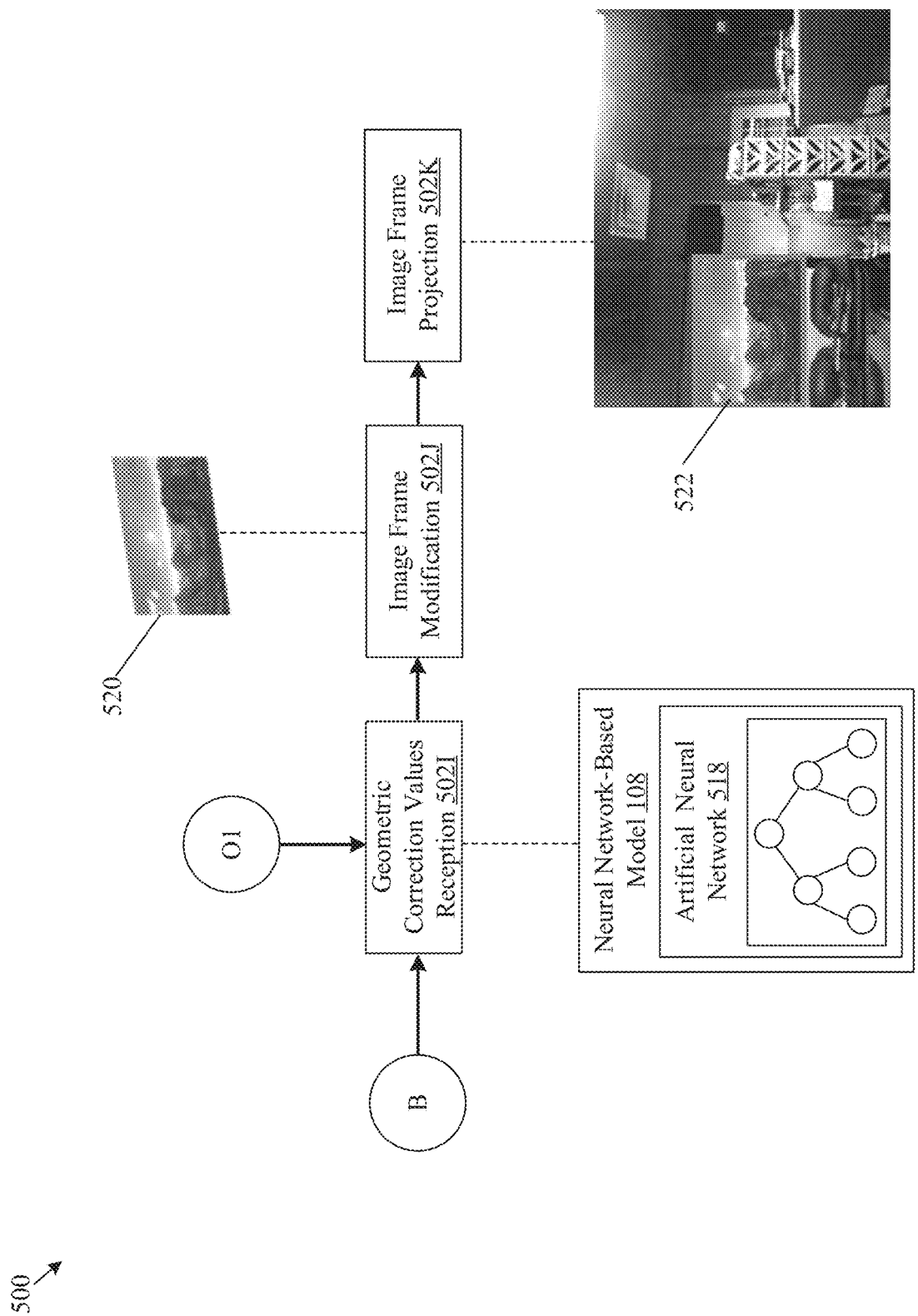

FIGS. 5A, 5B, and 5C are diagrams that collectively illustrate exemplary operations for a depth-based projection of image-based content on an uneven surface, in accordance with an embodiment of the disclosure. FIGS. 5A, 5B, and 5C are explained in conjunction with elements from FIGS. 1, 2, 3A, 3B, 4A, and 4B. With reference to FIGS. 5A, 5B, and 5C, there is shown a block diagram 500 that illustrates exemplary operations from 502A to 502K, as described herein. The exemplary operations illustrated in the block diagram 500 may start at 502A and may be performed by any computing system, apparatus, or device, such as by the projection system 102 of FIG. 1 or FIG. 2. Although illustrated with discrete blocks, the exemplary operations associated with one or more blocks of the block diagram 500 may be divided into additional blocks, combined into fewer blocks, or eliminated, depending on the particular implementation.

At 502A, a data acquisition operation may be performed. In the data acquisition operation, the circuitry 202 may be configured to acquire data required for the projection on a physical surface 504. The data may include depth data 506 associated with the physical surface 504 and an image frame 508 (which may be a portion of content to be projected). As depicted, the physical surface 504 may be an uneven surface or may be an even surface having some regions occluded by objects (such as a ladder or a sofa set). Because of the occlusion, even if the physical surface 504 is even, the depth data 506 for the even surface (such as a wall) may indicate unevenness around the regions which may be occluded. The data acquisition operation may be divided into a depth data acquisition operation and an image reception operation.

At 502B, a depth data acquisition may be performed. For depth data acquisition, the circuitry 202 may be configured to control the depth sensor 106 to acquire the depth data 506 associated with the physical surface 504. The depth data 506 may include information related to a distance between the physical surface 504 and the projection system 102. In an embodiment, the depth data 506 may be a depth image of the physical surface 504.

At 502C, the circuitry 202 may receive the image frame 508 to be projected on the physical surface 504. Details of the reception of the image frame 508 are provided, for example, in FIG. 1 and FIG. 4A.

At 502D, an even surface determination operation may be performed. The circuitry 202 may be configured to determine an even surface portion 510 within the physical surface 504 for the projection of the image frame 508. To determine the even surface, the circuitry 202 may be configured to determine first depth values associated with the corners of the physical surface 504. Based on the determination of the first depth values, the circuitry 202 may be configured to generate virtual depth data for the physical surface 504. In the virtual depth data, each depth value may be generated from a virtual plane, which may be determined based on corner values (i.e. first depth values).

The circuitry 202 may be further configured to compare the acquired depth data 506 with the generated virtual depth data to generate a comparison result. The circuitry 202 may be further configured to apply a clustering method on the comparison result. The clustering method may be applied to divide the physical surface 504 into surface clusters. Each of the surface clusters may correspond to one or more surface portions of the physical surface 504. The circuitry 202 may be further configured to determine a smoothness value for each of the surface clusters. The smoothness value may indicate the smoothness of the corresponding surface cluster.

The circuitry 202 may categorize one or more portions of the physical surface 504 into different categories based on the calculated smoothness value. The different categories of surfaces may include, for example, an even surface, an occluded surface, a protruded surface, a hollow surface, and the like. The circuitry 202 may be configured to further determine the even surface portion 510 of the physical surface 504 based on the categorization. In an embodiment, one or more even surface portions may be detected on the physical surface 504. In such scenarios, the determined even surface portion 510 may have a maximum size (or a maximum surface area) among the detected one or more even surface portions.

In an embodiment, the circuitry 202 may be configured to feed an input to a convolutional neural network (CNN) 512 to determine the even surface portion 510 in the physical surface 504. The input may include the acquired depth data 506 of the physical surface 504. The CNN 512 may be trained to determine the even surface portion 510 from the depth data. Based on the fed input, the circuitry 202 may receive an output of the CNN 512. In an embodiment, the received output may include a clustering result that may be indicative of the one or more even surface portions of the physical surface 504 and one or more uneven surface portions of the physical surface 504. The circuitry 202 may be configured to determine the even surface portion 510 of a maximum size from among the one or more even surface portions.

At 502E, a coordinate values extraction operation may be performed. In the coordinate values extraction operation, the circuitry 202 may be configured to extract coordinate values associated with corners 514 of the determined even surface portion 510. In an embodiment, the circuitry 202 may be configured to determine the corners of the even surface portion 510. As shown, the determined corners 514 may include four corners. Based on the determination of the corners of the even surface portion 510, the circuitry 202 may be further configured to extract the coordinates values associated with determined corners 514 of the even surface portion 510. The coordinate values may be represented in terms of image coordinates or a physical measurement values (e.g., with respect to a location in the room where the physical surface 504 is or with respect to a location of the depth sensor 106). In some embodiments, the circuitry 202 may receive the coordinate values associated with corners 514 of the determined even surface portion 510 from the CNN 512.

At 502F, an image frame resize operation may be performed. The image frame 508 may need to be resized because the image frame 508 (initially received (at 502C) for projection on the physical surface 504) may have to be projected on the determined even portion 510 (which is smaller than the size of the physical surface 504). The circuitry 202 may be configured to resize the image frame 508 to generate a resized image frame 516, which may be suitable for projection on the even surface portion 510 (bigger/largest among all even surface portions). The image frame 508 may be resized based on the extracted coordinate values. For example, corner coordinate values of the resized image frame 508 may match the extracted coordinate values (at 502E). In an embodiment, the resizing of the image frame 508 may correspond to an application of an image scaling operation on the image frame 508 to generate the resized image frame 516 while maintaining an aspect ratio of the image frame 508.

At 502G, a projection length determination operation may be performed. In the projection length determination operation, the circuitry 202 may be configured to determine a set of projection length values associated with the corners 514 of the determined even surface portion 510. Each projection length value of the set of projection length values may correspond to a distance of the corresponding corner (from the corners 514) to the projection system 102. In an embodiment, the circuitry 202 may be configured to determine the set of projection length values associated with the corners of the determined even surface portion 510, based on the depth data 506. In another embodiment, the set of projection length values may be received from the CNN 512 or any other artificial neural network model used in the projection system 102.

At 502H, a surface length values determination operation may be performed. The circuitry 202 may be configured to determine a set of surface length values associated with the sides of the determined even surface portion 510. Each of the surface length value of the set of surface length values may correspond to a length of the corresponding side of the determined even surface portion 510. In an embodiment, the circuitry 202 may be configured to determine the set of surface length values based on the extracted coordinate values of the corners 514 of the even surface portion 510. In another embodiment, the set of surface length values may be received from the CNN 512.

At 502I, a geometric correction values may be received. The circuitry 202 may be configured to receive a set of geometric correction values for the modification of the resized image frame 516 (or the image frame 508). The circuitry 202 may be configured to feed an input to an artificial neural network (ANN) 518. The input may include the determined projection length values (and the determined surface length values).

The ANN 518 may be a pre-trained neural network that may output the set of geometric correction values for the modification of the resized image frame 516 (or the image frame 508). In an embodiment, the set of geometric correction values may include four values ($\alpha$, $\beta$, $\delta$, $\Omega$). Details about the ANN 518 are provided, for example, in FIG. 9.

At 502J, an image frame modification operation may be performed. In the image frame modification operation, the circuitry 202 may be configured to modify the resized image frame 516 (or the image frame 508) based on the set of geometric correction values, to generate the modified image frame 520. The modification may be done to compensate for a mis-alignment of the projection system 102 relative to the physical surface 504. Also, the modification of the resized image frame 516 (or the image frame 508) may include an application of an image warping operation on the resized image frame 516 (or the image frame 508) while maintaining an aspect ratio of the resized image frame 516 (or the image frame 508).

At 502K, an image frame projection operation may be performed. In the image frame projection operation, the circuitry 202 may be configured to project the modified image frame 520 onto the determined even surface portion 510. A projected image frame 522 on the determined even surface portion 510 is shown in FIG. 5C, for example.

To project the modified image frame 520 on the even surface portion 510, the circuitry 202 may be configured to control the illumination circuitry 210 of the image projection sub-system 104 to project the modified image frame 520 onto the even surface portion 510. Details about the image projection sub-system 104 are provided, for example, in FIG. 8.

Figure 6A:
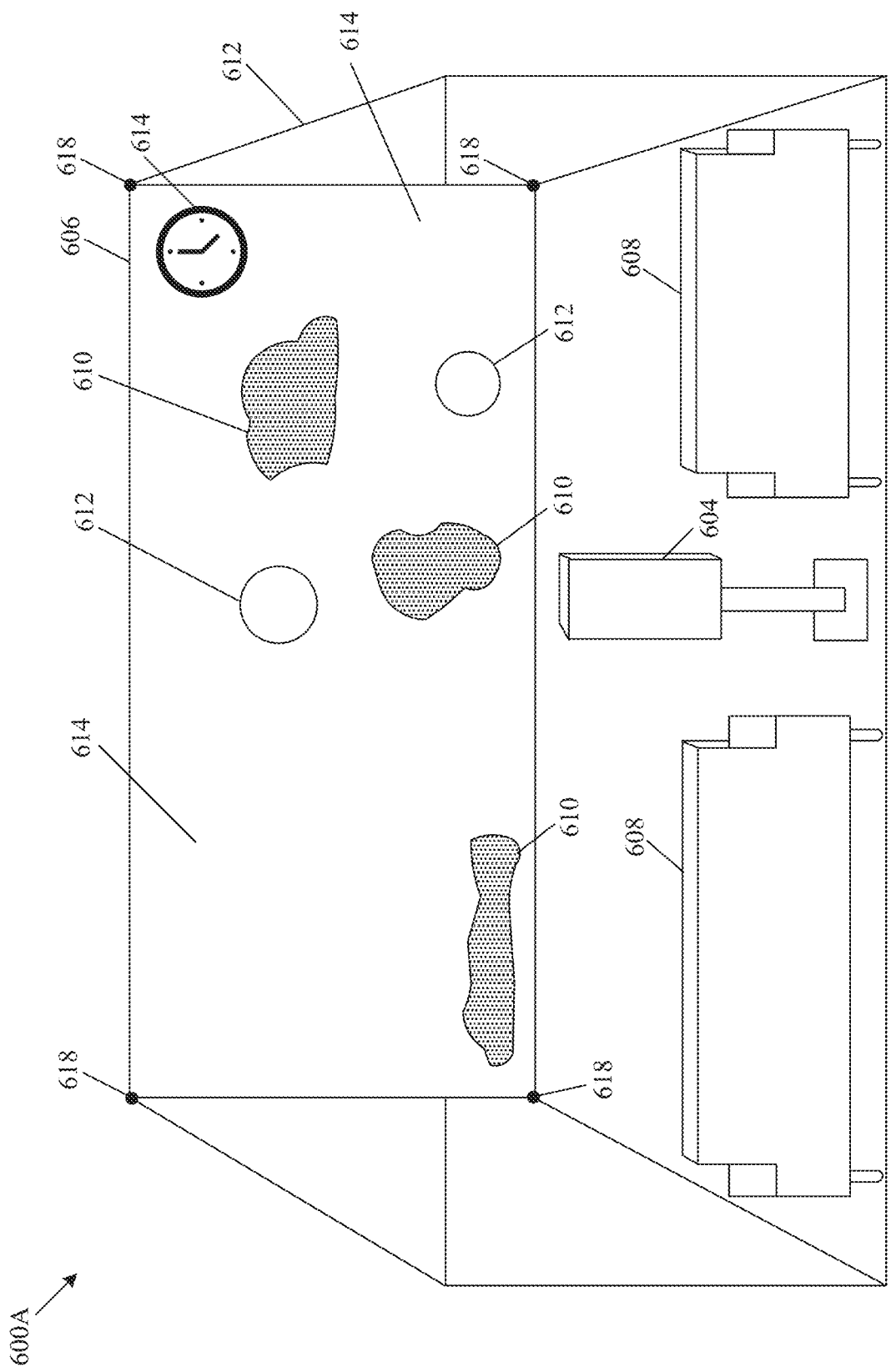
FIG. 6A is a diagram that depicts an exemplary scenario for depth-based projection of image-based content, in accordance with an embodiment of the disclosure.

FIG. 6A is a diagram that depicts an exemplary scenario for a depth-based projection of image-based content, in accordance with an embodiment of the disclosure. FIG. 6A is explained in conjunction with elements from FIGS. 1, 2, 3A, 3B, 4A, 4B, 5A, 5B, and 5C. With reference to FIG. 6A, there is shown an exemplary scenario 600 that includes a room 602 in which a projection system 604 is placed. The room may include a wall that may provide a physical surface 606 for the projection of the image frame 508. With reference to FIG. 6A, there is further shown a seating structure 608 (such as a sofa or a couch) on which a user associated with the projection system 604 may sit and watch the image frame 508. The physical surface 606 may be occluded by object(s), have protrusions, or may be hollow at some locations on the wall.

At any time instant after the projection system 102 is operational, the circuitry 202 may receive the image frame 508 for projection on the physical surface 606. The circuitry 202 may control the depth sensor 106 to acquire depth data associated with the physical surface 606. As discussed in previous figures, the depth data may include a depth map of the physical surface 606.

Due to a presence of even surface portions, occluded surface portions, or protrusions on the physical surface 606, the circuitry 202 may categorize the physical surface 110 into one or more protruded surface portions 610, one or more hollow surface portions 612, one or more occluded surface portion 614, and one or more even surface portions 616. Thereafter, the circuitry 202 may control the illumination circuitry 210 to project the image frame 508 on a first even surface portion of the one or more even surface portions 616.

For the categorization, the circuitry 202 may be configured to determine first depth values associated with corners 618 of the physical surface 606. It may be assumed that the distance of each corner 618 of the physical surface 606 may be same from the projection system 604. After the determination of the first depth values, the circuitry 202 may configured to generate virtual depth data (also described at 502D of FIG. 5A) for the physical surface 606 based on the determined first depth values.

After the generation of the virtual depth data, the circuitry 202 may be configured to compare the acquired depth data with the generated virtual depth data to generate a comparison result. Specifically, the circuitry 202 may be configured to compare the depth values associated with the physical surface 606 in the acquired depth data with the depth values associated with the physical surface 606 in the generated virtual depth data. The depth values associated with the one or more protruded surface portions 610 and the one or more occluded surface portions 614 in the acquired depth data may be less than the corresponding depth values in the generated virtual depth data. Similarly, the depth values associated with the one or more hollow surface portions 612 in the acquired depth data may be greater than the corresponding depth values in the generated virtual depth data. The depth values associated with the one or more even surface portions 616 in the acquired depth data may be same as (or approximately equal to) the corresponding depth values in the generated virtual depth data. Details about the comparison result are provided, for example, in FIG. 6B.

Figure 6B:
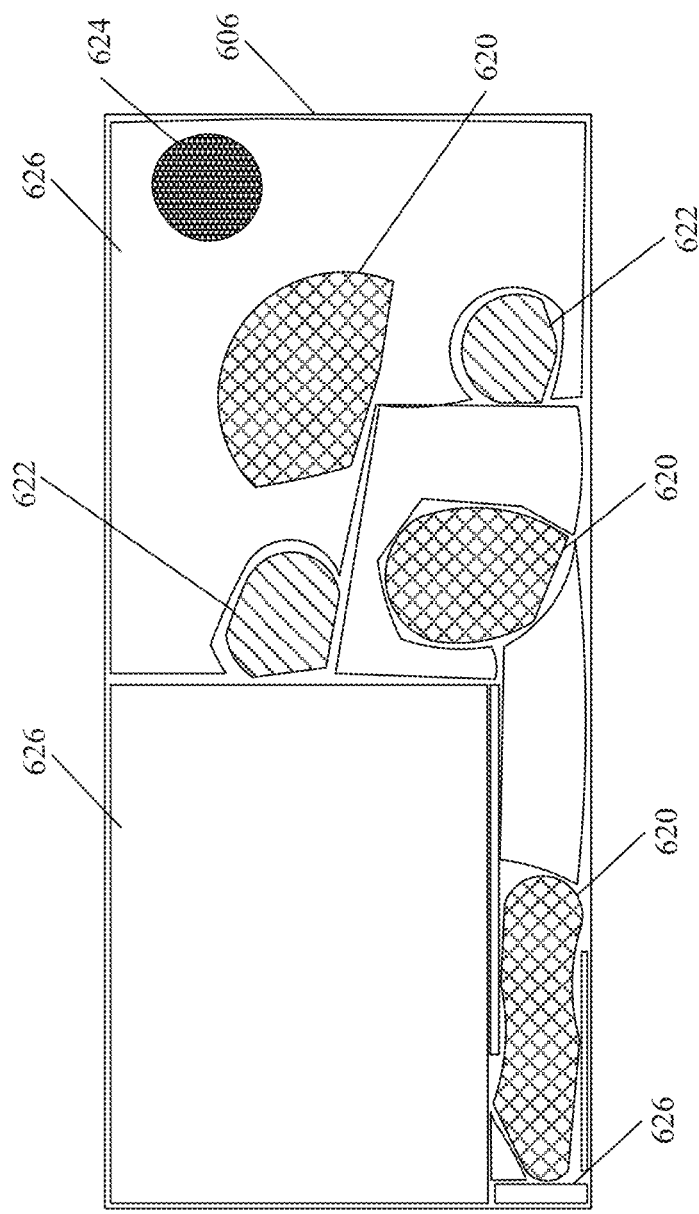
FIG. 6B is a diagram that depicts exemplary surface clusters a physical surface of FIG. 6A, in accordance with an embodiment of the disclosure.

FIG. 6B is a diagram that depicts exemplary surface clusters on a physical surface of FIG. 6A, in accordance with an embodiment of the disclosure. FIG. 6B is explained in conjunction with elements from FIGS. 1, 2, 3A, 3B, 4A, 4B, 5A, 5B, 5C, and 6A. With reference to FIG. 6B, there is shown an exemplary scenario the physical surface 606 of FIG. 6A. The physical surface 606 may be divided into a first set of surface clusters 620, a second set of surface clusters 622, a third set of surface clusters 624, and a fourth set of surface clusters 626.

Based on the comparison result, the circuitry 202 may be configured to apply a clustering method to divide the physical surface 606 into surface clusters. Specifically, the physical surface 606 may be divided into the surface clusters based on the depth values associated with the corresponding surface portion. By way of example, and not limitation, a surface cluster may be generated for each of the one or more protruded surface portions 610, one or more hollow surface portions 612, one or more occluded surface portions 614, and one or more even surface portions 616. As shown, for example, the first set of surface clusters 620 may correspond to the one or more protruded surface portions 610. The second set of surface clusters 622 may correspond to the one or more hollow surface portions 612. The third set of surface clusters 624 may corresponded to the one or more occluded surface portions 614. Similarly, the fourth set of surface clusters may correspond to the one or more even surface portions 616.

In an embodiment, the circuitry 202 may be configured to calculate a percentage of depth values that may be same in the acquired depth data and the generated virtual depth day for each cluster. The circuitry 202 may further compare the calculated percentage with a minimum threshold value and/or a maximum threshold value to determine a smoothness value for each cluster. The smoothness value for each cluster may indicate a smoothness or a flatness of the corresponding surface portion.

The circuitry 202 may categorize one or more portions of the physical surface into different categories based on the calculated smoothness value. The different categories may include, but are not limited to, an even surface category, an un-even surface category, and a not-recommended surface category for projection. The even surface category may include the even surface portions. The un-even surface category may include the occluded surface portions, the protruded surface portions, and the hollow surface portions.

By way of example, and not limitation, if the minimum threshold is 30% and the maximum threshold is 60% and if calculated percentage is greater than the maximum threshold (say 70%), then the corresponding surface cluster may be categorized into the even surface category. If the calculated percentage is between the minimum threshold and the maximum threshold (say 50%), then the corresponding surface cluster may be categorized into the uneven surface category. If the calculated percentage is below the minimum threshold (say 20%), then the corresponding surface cluster may be categorized into the not-recommended surface category.

In an embodiment, the circuitry 202 may be configured to control the illumination circuitry 210 to project the image frame 508 on even surface portions. In case there are no even surface portions and an area of the even surface portion is less than a threshold, the circuitry 202 may output an error (for example, a message may be displayed on a display integrated into or coupled to the projection system 102). The error may indicate that the physical surface 606 unsuitable for the projection of the image frame 508.

FIG. 6C is a diagram that depicts an exemplary scenario for projection of an image frame of FIG. 6A, in accordance with an embodiment of the disclosure. FIG. 6C is explained in conjunction with elements from FIGS. 1, 2, 3A, 3B, 4A, 4B, 5A, 5B, 5C, 6A, and 6B. With reference to FIG. 6C, there is shown an exemplary scenario 600C which includes a projected image frame 628 on a first even surface portion 626A.

Based on the categorization of the one or more portions of the physical surface 606, the circuitry 202 may be configured to determine the first even surface portion 626A of the physical surface 606 for the projection of the image frame 508. In case there are one or more even surface portions 616 on the physical surface 606, the circuitry 202 may be configured to determine the first even surface portion 626A portion that may be of maximum size (or maximum area) from among that of the one or more even surface portions 616 of the physical surface 606. After the determination of the first even surface portion 626A, the circuitry 202 may be further configured to control the illumination circuitry 210 to project the image frame 508 on the determined first even surface portion 626A. The projected image frame 628 is depicted in FIG. 6C, for example.

Figure 7:
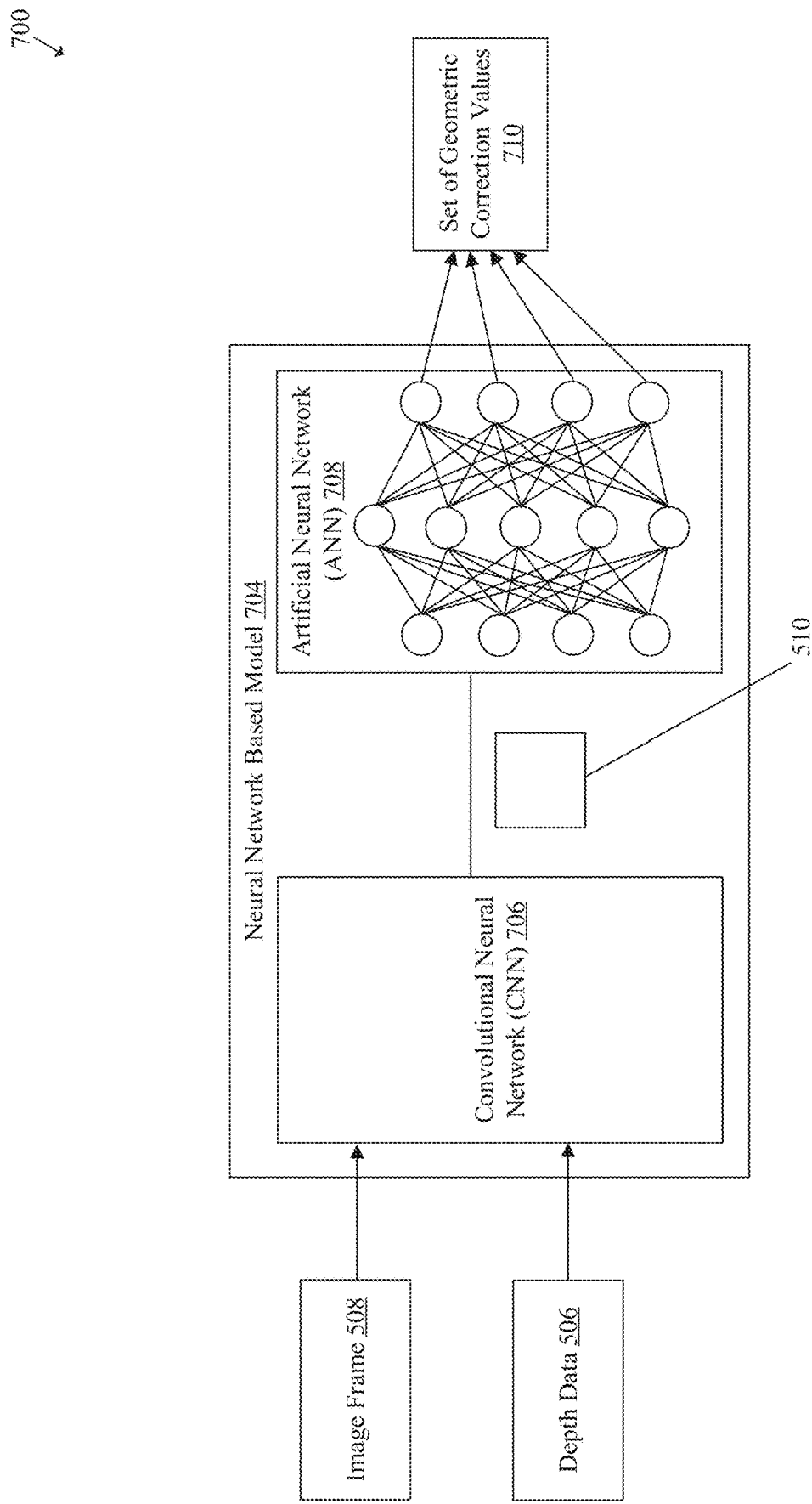
FIG. 7 is a diagram that depicts an architecture of a neural-network based model for a depth-based projection of image-based content, in accordance with an embodiment of the disclosure.

FIG. 7 is a diagram that depicts an architecture of a neural network-based model to be used for a depth-based projection of image-based content, in accordance with an embodiment of the disclosure. FIG. 7 is explained in conjunction with elements from FIGS. 1, 2, 3A, 3B, 4A, 4B, 5A, 5B, 5C, 6A, 6B, and 6C. With reference to FIG. 7, there is shown an exemplary architecture 700. There is further shown a projection system 702, that includes a neural network-based model 704. The neural network-based model 704 may include a convolutional neural network (CNN) 706 and an artificial neural network (ANN) 708. With reference to FIG. 7, there is further shown an input layer 708A, a hidden layer 708B, and an output layer 708C of the ANN 708.

The projection system 702 may receive the image frame 508 for projection on the physical surface 504. The projection system 702 may further acquire the depth data 506 associated with the physical surface 504. The received image frame 508 and the acquired depth data 506 are provided as an input to an input layer of the CNN 706 of the neural network-based model 704. As discussed above, the CNN 706 may be trained to determine the even surface portion 510 of the physical surface 504 and calculate projection length values associated with the even surface portion 510. An output layer of the CNN 706 may be coupled to the input layer 708A of the ANN 708. Therefore, the calculated projection length values may be provided as an input to the input layer 708A of the ANN 708.

The CNN 706 may be a computational network or a system of artificial neurons, arranged in a plurality of layers, as nodes. The plurality of layers of the neural network may include an input layer, one or more hidden layers, and an output layer. Each layer of the plurality of layers may include one or more nodes (or artificial neurons). Outputs of all nodes in the input layer may be coupled to at least one node of hidden layer(s). Similarly, inputs of each hidden layer may be coupled to outputs of at least one node in other layers of the CNN 706. Outputs of each hidden layer may be coupled to inputs of at least one node in other layers of the CNN 706. Node(s) in the final layer may receive inputs from at least one hidden layer to output a result. The number of layers and the number of nodes in each layer may be determined from hyper-parameters of the CNN 706. Such hyper-parameters may be set before, while training, or after training the CNN 706 on a training dataset.

Each node of the CNN 706 may correspond to a mathematical function (e.g., a sigmoid function or a rectified linear unit) with a set of parameters, tunable during training of the network. The set of parameters may include, for example, a weight parameter, a regularization parameter, and the like. Each node may use the mathematical function to compute an output based on one or more inputs from nodes in other layer(s) (e.g., previous layer(s)) of the CNN 706. All or some of the nodes of the CNN 706 may correspond to same or a different same mathematical function.

In training of the CNN 706, one or more parameters of each node of the CNN 706 may be updated based on whether an output of the final layer for a given input (from a training dataset) matches a correct result based on a loss function for the CNN 706. The above process may be repeated for same or a different input till a minima of loss function may be achieved, and a training error may be minimized. Several methods for training are known in art, for example, gradient descent, stochastic gradient descent, batch gradient descent, gradient boost, meta-heuristics, and the like.

The CNN 706 may include electronic data, which may be implemented as, for example, a software component of an application executable on the projection system 102. The CNN 706 may rely on libraries, external scripts, or other logic/instructions for execution by a processing device, such as the circuitry 202. The CNN 706 may include code and routines configured to enable a computing device, such as the circuitry 202 to perform one or more operations for determination of the even surface portion 510. Additionally, or alternatively, the CNN 706 may be implemented using hardware including a processor, a microprocessor (e.g., to perform or control performance of one or more operations), a field-programmable gate array (FPGA), or an application-specific integrated circuit (ASIC). Alternatively, in some embodiments, the CNN 706 may be implemented using a combination of hardware and software.

The ANN 708 may be a computational network or a system of artificial neurons, arranged in a plurality of layers, as nodes (shown by circles). The plurality of layers of the ANN 708 may include the input layer 708A, the hidden layer 708B, and the output layer 708C. Each layer of the plurality of layers may include one or more nodes (or artificial neurons, represented by circles, for example). Outputs of all nodes in the input layer 708A may be coupled to at least one node of the hidden layer 708B. Similarly, inputs of the hidden layer 708B may be coupled to outputs of at least one node in other layers of the ANN 708. Outputs of the hidden layer 708B may be coupled to inputs of at least one node in other layers of the ANN 708. Node(s) in the output layer 708C may receive inputs from the hidden layer 708B to output a result as a set of geometric correction values 710. The number of layers and the number of nodes in each layer may be determined from hyper-parameters of the ANN 708. Such hyper-parameters may be set before, while training, or after training the ANN 708 on a training dataset.

Each node of the ANN 708 may correspond to a mathematical function (e.g., a sigmoid function or a rectified linear unit) with a set of parameters, tunable during training of the ANN 708. The set of parameters may include, for example, a weight parameter, a regularization parameter, and the like. Each node may use the mathematical function to compute an output based on one or more inputs from nodes in other layer(s) (e.g., previous layer(s)) of the ANN 708. All or some of the nodes of the ANN 708 may correspond to same or a different same mathematical function.

The ANN 708 may include electronic data, which may be implemented as, for example, a software component of an application executable on the projection system 102. The ANN 708 may rely on libraries, external scripts, or other logic/instructions for execution by a processing device, such as circuitry 202. The ANN 708 may include code and routines configured to enable a computing device, such as the circuitry 202 to perform one or more operations for generation of the set of geometric correction values 710. Additionally, or alternatively, the ANN 708 may be implemented using hardware including a processor, a microprocessor (e.g., to perform or control performance of one or more operations), a field-programmable gate array (FPGA), or an application-specific integrated circuit (ASIC). Alternatively, in some embodiments, the ANN 708 may be implemented using a combination of hardware and software.

Figure 8:
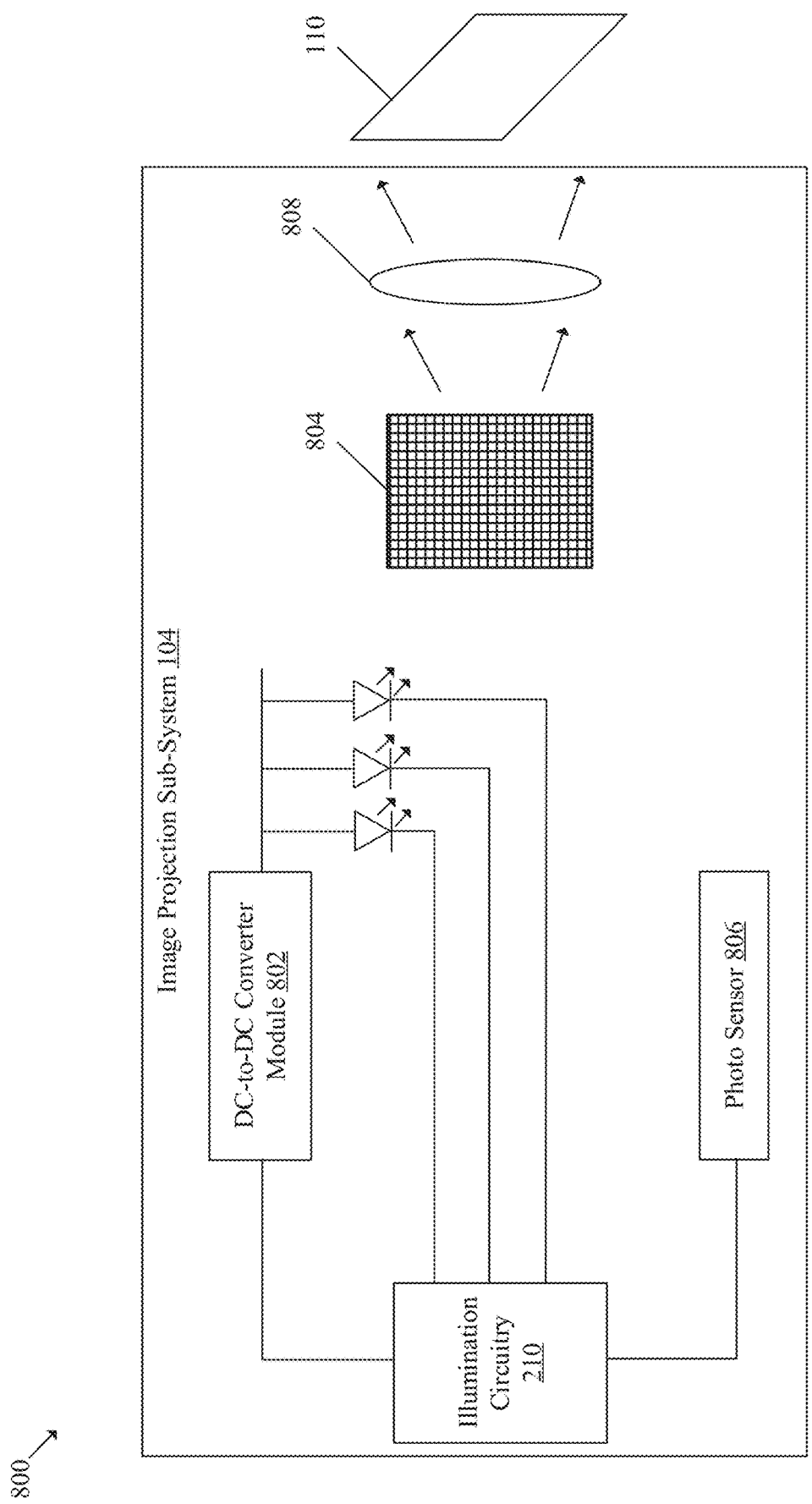
FIG. 8 is an exemplary block diagram of an image projection sub-system of a projection system of FIG. 1, in accordance with an embodiment of the disclosure

The projection system 702 may receive the set of geometric correction values 710 from the output layer 708C of the ANN 708. Thereafter, the projection system 702 may modify the image frame 508 based on the receive the set of geometric correction values 710 and may project the modified image frame 520 on the even surface portion 510. Details about modification of the image frame 508 and projection of the modified image frame 520 on the even surface portion 510 are provided, for example, in FIGS. 5A, 5B, and 5C FIG. 8 is an exemplary block diagram of an image projection sub-system of a projection system of FIG. 1, in accordance with an embodiment of the disclosure. FIG. 8 is explained in conjunction with elements from FIGS. 1, 2, 3A, 3B, 4A, 4B, 5A, 5B, 5C, 6A, 6B, 6C, and 7. With reference to FIG. 8, there is shown a block diagram 800 of the image projection sub-system 104. The image projection sub-system 104 may include the illumination circuitry 210, a direct current to direct current (DC-to-DC) converter module 802, one or more liquid crystal on silicon (LCoS) panels 804, a photo sensor 806, and a projection lens 808. The image projection sub-system 104 may also include other components, which are omitted from the disclosure for the sake of brevity. The illumination circuitry 210 may be communicatively coupled to the DC-to-DC converter module 802, the one or more LCoS panels 804, the photo sensor 806, and the projection lens 808.

The DC-to-DC converter module 802 may include suitable logic, circuitry, or interfaces that may be configured to convert a source of direct current (DC) from a first voltage level to a second voltage level. The second voltage level may be less than or greater than the first voltage level. Examples of implementations of the DC-to-DC converter module 802 may be a switching based DC-to-DC converter, a magnetic DC-to-DC converter, a non-isolated DC-to-DC converter, a Step-Down (Buck) converter, a Step-Up (Boost) converter, a Buck-Boost converter, an isolated converter, a fly back converter, and/or a forward converter.

Each of the one or more LCoS panels 804 may be a miniaturized reflective active-matrix liquid-crystal display that may use a liquid crystal layer on top of a silicon backplane. Specifically, each of the one or more LCoS panels 804 may have pixels in the liquid crystal layer that may be controlled using an electric current and a semiconductor silicon layer that enables the corresponding LCoS panel to reflect light. Light from the modified image frame 520 may be split into red, blue and green beams, each of which may be then guided onto a separate LCoS panel of the one or more LCoS panels 804. For example, a red light beam may be passed to a first LCoS panel of the one or more LCoS panels 804, a green light beam may be passed to a second LCoS panel of the one or more LCoS panels 804, and a blue light beam may be passed to a third LCoS panel of the one or more LCoS panels 804. The light beams that pass through the one or more LCoS panels 804 may produce red, blue and green variants of the modified image frame 520. The red, blue and green variants of the modified image frame 520 from the one or more LCoS panels 804 may be combined using a prism to produce a final image to be projected on the physical surface 110. In an embodiment, the one or mor LCoS panels 804 may include only one LCoS panel. In such an implementation, the LCoS panel may be based on a single-panel architecture.

The photo sensor 806 may include suitable logic, circuitry, and/or interfaces that may be configured to synchronize the sequence of image frames 116 and the projected image frames. Specifically, the photo sensor 806 may be configured to determine synchronization latency of the projection system 102 and further synchronize the sequence of image frames 116 and the projected image frame based on the determined synchronization latency.

The projection lens 808 may be configured to magnify and focus the modified image frame 520 for projection on the physical surface 110. The projection lens 808 may either be a zoom projection lens or a fixed focus projection lens. The zoom projection lens may have multiple focal lengths whereas the fixed focus projection lens may focus images at a single fixed distance.

Figure 9:
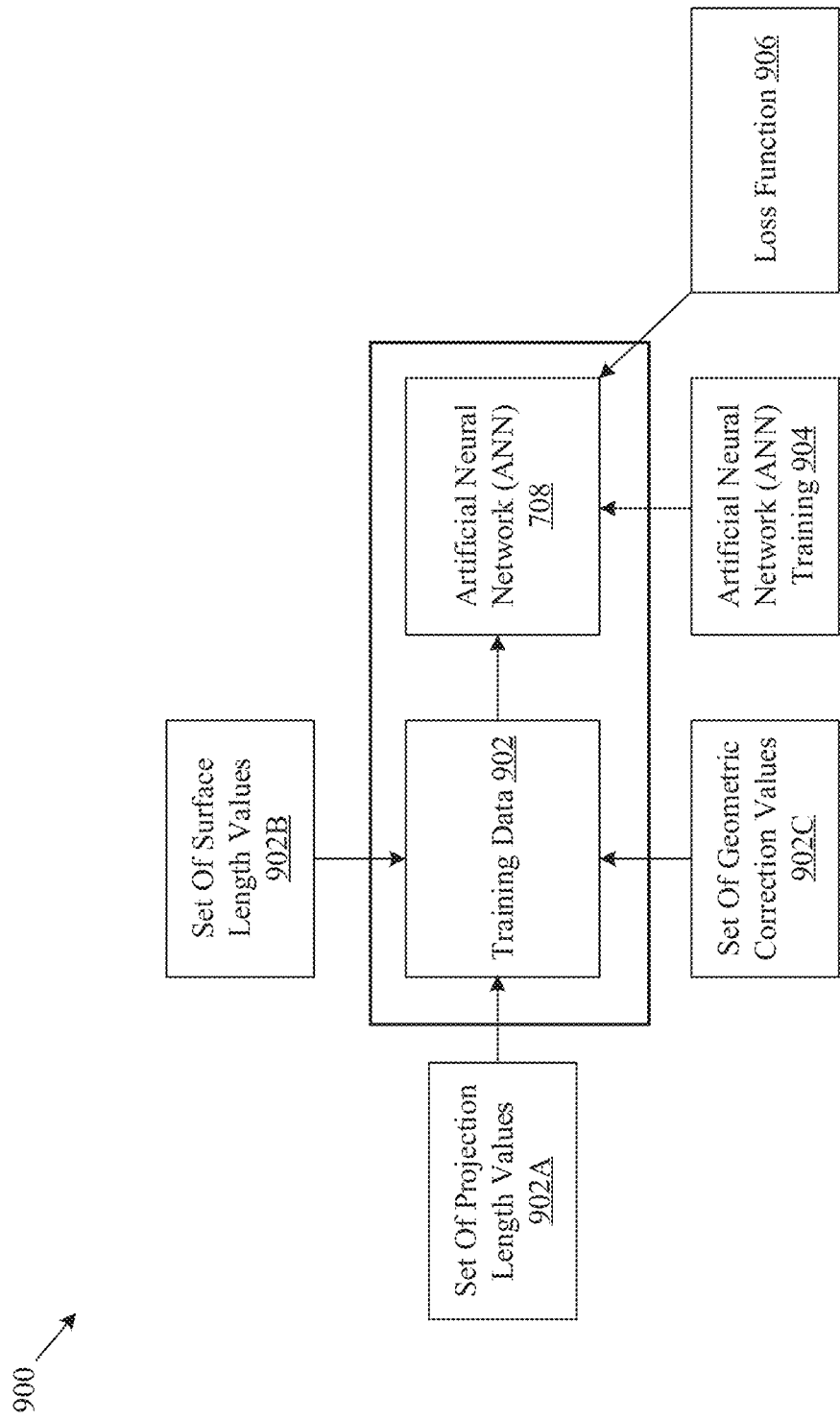
FIG. 9 is a diagram that illustrates exemplary operations for training of an artificial neural network of the neural network-based model of FIG. 7, in accordance with an embodiment of the disclosure.

FIG. 9 is a diagram that illustrates exemplary operations for training of an artificial neural network of the neural network-based model of FIG. 7, in accordance with an embodiment of the disclosure. FIG. 9 is explained in conjunction with elements from FIGS. 1, 2, 3A, 3B, 4A, 4B, 5A, 5B, 5C, 6A, 6B, 6C, 7, and 8. With reference to FIG. 9, there is shown a diagram 900 to depict exemplary operations from 902 to 904. The exemplary operations illustrated in the diagram 900 may start at 902 and may be performed by any computing system, apparatus, or device, such as by the projection system 102 of FIG. 1 or FIG. 2.

At 902, training data may be input to the artificial neural network (ANN) 708. The training data may be multimodal data and may be used to train the ANN 708. The training data may include, for example, a set of projection length values 902A, a set of surface length values 902B, and a set of geometric correction values 902C. For example, the training data may be associated with a generation of geometric correction values for various combinations of projection length values and surface length values.

The training data may include a plurality of training samples. Each training sample of the plurality of training samples may include a first set of values (i.e. the set of projection length values 902A) for a first parameter, a second set of values (i.e. the set of surface length values 902B) for a second parameter, and a third set of values (set of geometric correction values 902C) for a third parameter. The first parameter may correspond to a projection length. The second parameter may correspond to a surface length. The third parameter may correspond to geometric correction values An example portion of the training data is presented in Table 1, as follows:

TABLE 1

Training Data

| S. No. | Projection Length Values (a, b, c, d) | Surface Length Values (w, x, y, z) | Geometric Correction Values ($\alpha, \beta, \delta, \Omega$) |
|---|---|---|---|
| 1 | (a1, b1, c1, d1) | (w1, x1, y1, z1) | ($\alpha$1, $\beta$1, $\delta$1, $\Omega$1) |
| 2 | (a2, b2, c2, d2) | (w2, x2, y2, z2) | ($\alpha$2, $\beta$2, $\delta$2, $\Omega$2) |
| 3 | (a3, b3, c3, d3) | (w3, x3, y3, z3) | ($\alpha$3, $\beta$3, $\delta$3, $\Omega$3) |

With reference to Table 1, the first set of values may include projection length values associated with corners of the physical surface 110 (or the determined even surface portion 510). The projection length values may correspond to absolute distance between the projection system 102 and the corners of the physical surface 110 (or the corners of the determined even surface portion 510). Therefore, the first set of values may include four values. By way of example, and not limitation, if an absolute distance between the top left corner and the projection system 102 is 'a1', an absolute distance between the top right corner and the projection system 102 is 'b1', an absolute distance between the bottom left corner and the projection system 102 is 'c1', and an absolute distance between the bottom right corner and the projection system 102 is 'd1', then the first set of values (or a first projection lengths value) may be (a1, b1, c1, d1).

With reference to Table 1, the second set of values may include surface length values associated with the physical surface 110 (or the determined even surface portion). The surface length values may correspond to absolute distance between the corners of the physical surface 110. Therefore, the second set of values may include four values. By way of example, and not limitation, if an absolute distance between the top left corner and the top right corner is 'w1', an absolute distance between the bottom left corner and the bottom right corner is 'x1', an absolute distance between the top left corner and the bottom left corner is 'y1', an absolute distance between the top right corner and the bottom right corner is 'z1', then the second set of values (or a first surface lengths value) may be (w1, x1, y1, z1).

With reference to Table 1, the third set of values may include geometric correction values for modification of an image frame for projection on the physical surface 110 (or the determined even surface portion). The geometric correction values may correspond to dimensions for the modified first image frame. Therefore, the third set of values may also include four values for each side of the modified first image frame. By way of example and not limitation, if a first dimension between the top left corner and the top right corner is '$\alpha$1', a second dimension between the bottom left corner and the bottom right corner is '$\beta$2', a third dimension between the top left corner and the bottom left corner is '$\delta$3', a fourth dimension between the top right corner and the bottom right corner is '$\Omega$4', then the third set of values (or a first geometric corrections value) may be ($\alpha$1, $\beta$1, $\delta$1, $\Omega$1).

It should be noted that each of the plurality of training samples may include corresponding first set of values, second set of values, and the third set of values. By way of example, for the second training sample with serial number 2, the first set of values may be (a2, b2, c2, d2), the second set of values may be (w1, x1, y1, z1), and the third set of values may be ($\alpha$2, $\beta$2, $\delta$2, $\Omega$2). Similarly, for the Nth training sample, the first set of values may be (an, bn, cn, dn), the second set of values may be (wn, xn, yn, zn), and the third set of values may be ($\alpha$n, $\beta$n, $\delta$n, $\Omega$n). The description for the second training sample and the Nth training sample have been omitted for the sake of brevity.

At 904, the ANN 708 may be trained on the training data. Before training, a set of hyperparameters may be selected based on a user input, for example, from a software developer. For example, an initial learning rate and random weight values may be selected for the ANN 708. Also, all the layer of the ANN 708 may be initially updated to a fully-connected configuration.

In training, the training data may be sequentially passed as inputs to the ANN 708. The ANN 708 may learn to generate the set of geometric correction values as output based on the set of projection length values and the set of surface length values as input. Parameters, such as weights of the ANN 708 may be updated based on an optimization algorithm (such as stochastic gradient descent) to minimize a loss function 906 for the ANN 708. Once trained, the ANN 708 may output a prediction, which may include a final set of geometric correction values for a test set of projection length values, and a test set of surface length values. The test set of projection length values, and the test set of surface length values may not be a part of training dataset but may be a part of a testing dataset.

Although the diagram 900 is illustrated as discrete operations, such as 902, 904 and 906, however, in certain embodiments, such discrete operations may be further divided into additional operations, combined into fewer operations, or eliminated, depending on the particular implementation without detracting from the essence of the disclosed embodiments.

Figure 10:
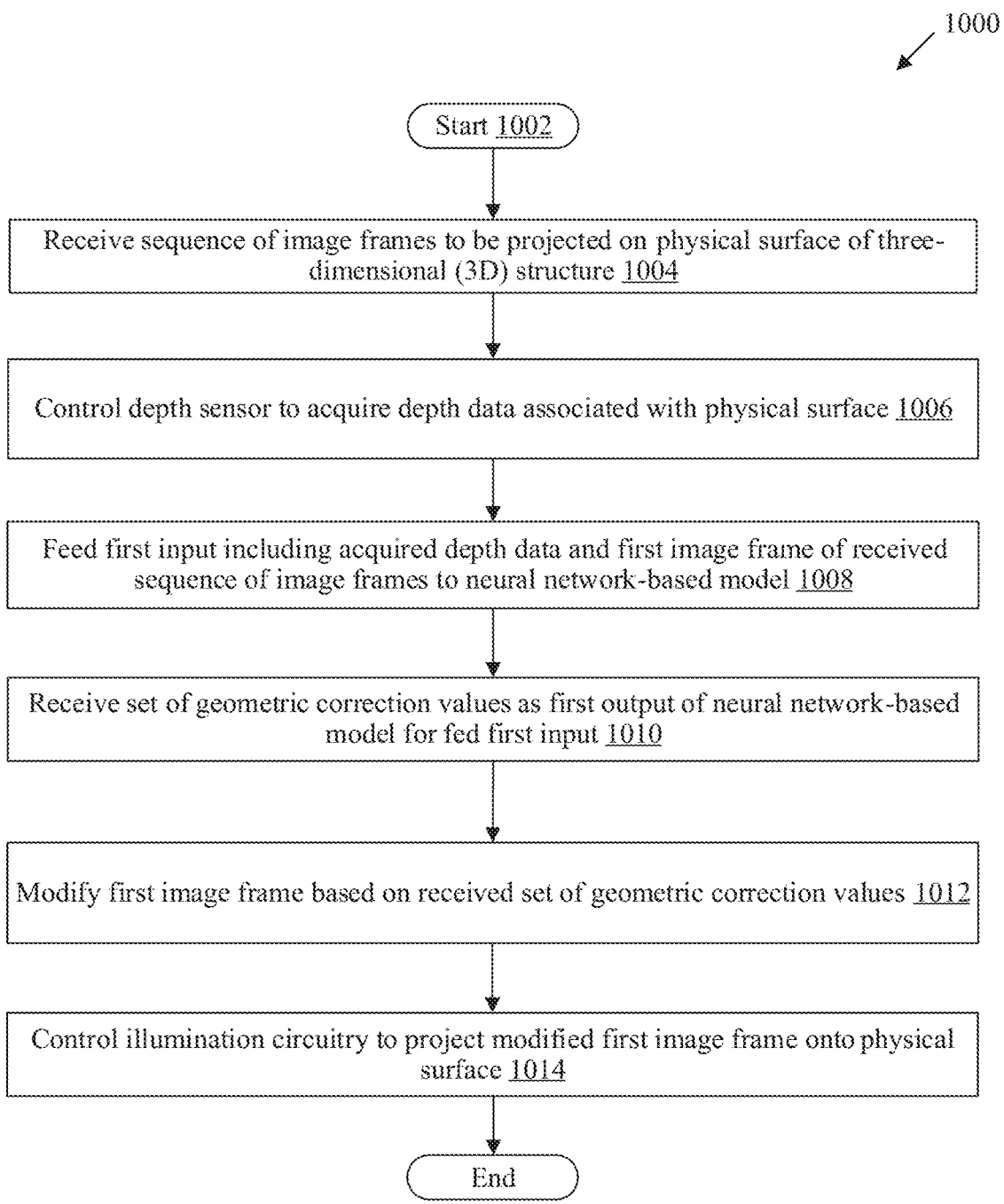
FIG. 10 is a flowchart that illustrates an exemplary method for depth-based projection of image-based content, in accordance with an embodiment of the disclosure.

FIG. 10 is a flowchart that illustrates an exemplary method for depth-based projection of image-based content, in accordance with an embodiment of the disclosure. FIG. 10 is explained in conjunction with elements from FIGS. 1, 2, 3, 4A, 4B, 5A, 5B, 5C, 6A, 6B, 6C, 7, 8, and 9. With reference to FIG. 10, there is shown a flowchart 1000. The operations of the exemplary method may be executed by any computing system, for example, by the projection system 102 of FIG. 1 or the circuitry 202 of FIG. 2. The operations of the flowchart 1000 may start at 1002 and may proceed to 1004.

At 1004, the sequence of image frames 116 may be received. The sequence of image frames 116 may be received to be projected on the physical surface 110 of a three-dimensional (3D) structure. In at least one embodiment, the circuitry 202 may receive the sequence of image frames 116 to be projected on the physical surface 110 of the three-dimensional (3D) structure. The sequence of image frames 116 may be received from the server 112 or from the memory 204 of the projection system 102. The details about reception of the sequence of image frames 116 as provided, for example, in FIGS. 1, 4A (at 402A), and 5A (at 502C).

At 1006, the depth sensor 106 may be controlled to acquire depth data associated with the physical surface 110. In at least one embodiment, the circuitry 202 may control the depth sensor 106 to acquire depth data associated with the physical surface 110. The details about the acquired depth data are provided, for example, in FIGS. 1, 4A, and 5A.

At 1008, a first input including the acquired depth data and the first image frame 116A of the received sequence of image frames 116 may be fed to the neural network-based model 108. In at least one embodiment, the circuitry 202 may feed the first input that may include the acquired depth data and the first image frame 116A of the received sequence of image frames 116 to the neural network-based model 108. The neural network-based model 108 may include the CNN 706 and the ANN 708. The input layer of the ANN 708 may be coupled to an output layer of the CNN 706. The details about the neural network-based model 108 are provided, for example, in FIGS. 1, 4A, 4B, 5A, 5B, 5C, 6A, 6B, 6C, 7 and 9.

At 1010, a set of geometric correction values may be received as, a first output, from the neural network-based model 108 for the fed first input. In at least one embodiment, the circuitry 202 may receive the set of geometric correction values as the first output of the neural network-based model 108 for the fed first input. The details about the set of geometric correction values are provided, for example, in FIGS. 1, 4A, 4B, 5A, 5B, 5C, 6A, 6B, 6C, 7, and 9.

At 1012, the first image frame 116A may be modified based on the received set of geometric correction values. The modification of the first image frame 116A may include an application of an image warping operation on the first image frame 116A while maintaining an aspect ratio of the first image frame 116A. In at least one embodiment, the circuitry 202 may modify the first image frame based on the received set of geometric correction values. The details about the modification of the first image frame 116A are provided, for example, in FIGS. 1, 4A, 4B, 5B, and 5C.

At 1014, the illumination circuitry 210 may be controlled to project the modified first image frame onto the physical surface 110. In at least one embodiment, the circuitry 202 may control the illumination circuitry 210 to project the modified first image frame onto the physical surface 110. The details about the image projection sub-system 104 are provided, for example, in FIG. 8. Control may pass to end.

Various embodiments of the disclosure may provide a non-transitory computer readable medium and/or storage medium having stored thereon, instructions executable by a machine and/or a computer to operate a projection system (e.g., the projection system 102) for depth-based projection of image-based content. The instructions may cause the machine and/or computer to perform operations that include receiving a sequence of image frames (e.g., the sequence of image frames 116) to be projected on a physical surface (e.g. the physical surface 110) of a three-dimensional (3D) structure. The operations further include controlling a depth sensor (e.g., the depth sensor 106) to acquire depth data associated with the physical surface. The operations further include feeding a first input including the acquired depth data and a first image frame (e.g., the first image frame 116A) of the received sequence of image frames to a neural network-based model (e.g., the neural network-based model 108). The operations may further include receiving a set of geometric correction values as a first output of the neural network-based model for the fed first input. The operations may further include modifying the first image frame based on the received set of geometric correction values and controlling illumination circuitry (such as the illumination circuitry 210) of an image-projection sub-system (such as the image projection sub-system 104) communicatively coupled to the projection system, to project the modified first image frame (e.g., the modified first image frame 410) onto the physical surface.

Certain embodiments of the disclosure may be found in a projection system, and a method for depth-based projection of image-based content. Various embodiments of the disclosure may provide the projection system 102 that may include the image projection sub-system 104 and the circuitry 202. The image projection sub-system 104 may be coupled to the circuitry 202 and may include the illumination circuitry 210. The circuitry 202 may be configured to receive the sequence of image frames 116 to be projected on the physical surface 504 of a three-dimensional (3D) structure. The circuitry 202 may be further configured to control the depth sensor 106 to acquire the depth data 506 associated with the physical surface 504. The circuitry 202 may be further configured to feed a first input including the acquired depth data 506 and the image frame 508 of the received sequence of image frames 116 to the neural network-based model 108. The circuitry 202 may be further configured to receive a set of geometric correction values as a first output of the neural network-based model 108 for the fed first input. The circuitry 202 may be further configured to modify the image frame 508 based on the received set of geometric correction values. The modification of the image frame 508 may include an application of an image warping operation on the image frame 508 while maintaining an aspect ratio of the image frame 508. The circuitry 202 may be further configured to control the illumination circuitry 210 of the image projection sub-system 104 to project the modified image frame 520 onto the physical surface 504.

In accordance with an embodiment, the circuitry 202 may be configured to determine first depth values associated with corners 514 of the physical surface 504. The circuitry 202 may be further configured to generate virtual depth data for the physical surface 504 based on the determined first depth values. The circuitry 202 may be further configured to compare the acquired depth data with the generated virtual depth data to generate a comparison result and apply a clustering method on the comparison result to divide the physical surface 504 into surface clusters. Each of surface clusters corresponds to one or more surface portions of the physical surface 504. The circuitry 202 may be further configured to calculate a smoothness value for each of the surface clusters and categorize one or more portions of the physical surface into different categories based on the calculated smoothness value. The circuitry 202 may be further configured to determine the even surface portion 510 of the physical surface 504, based on the categorization. The modified image frame 520 may be projected onto the determined even surface portion 510.

In accordance with an embodiment, the neural network-based model 704 may include the CNN 706, and the first input, at first, may be fed to the CNN 706. The circuitry 202 may be configured to input the acquired depth data 506 to the CNN 706. The circuitry 202 may receive an output of the CNN 706 for the input depth data 506. The received output may include a clustering result that may be indicative of one or more even surface portions of the physical surface 504 and one or more uneven surface portions of the physical surface 504. The circuitry 202 may be further configured to determine an even surface portion 510 of a maximum size from among that of the one or more even surface portions. The even surface portion may be determined based on the clustering result.

In accordance with an embodiment, the circuitry 202 may be configured to extract coordinate values associated with corners of the determined even surface portion 510. The circuitry 202 may be further configured to resize the image frame 508 based on the extracted coordinate values and modify the resized image frame 516 based on the received set of geometric correction values. The modified image frame 516 may be projected onto the determined even surface portion 510 of the physical surface 504.

In accordance with an embodiment, the neural network-based model 704 may further include an ANN 708, an input layer 708A of which may be coupled to an output layer of the CNN 706. The circuitry 202 may be configured to determine a set of projection length values associated with corners of the determined even surface portion 510 and input the determined set of projection length values to the ANN

708. The ANN 708 generates the first output that includes the set of geometric correction values based on the input set of projection length values.

The present disclosure may be realized in software, hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions.

The present disclosure may also be embedded in a computer program product, which includes all the features that enable the implementation of the methods described herein, and which, when loaded in a computer system, is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made, and equivalents may be substituted without deviation from the scope of the present disclosure. In addition, many modifications may be made to adapt a particular situation or material to the teachings of the present disclosure without deviation from its scope. Therefore, it is intended that the present disclosure is not limited to the particular embodiment disclosed, but that the present disclosure will include all embodiments falling within the scope of the appended claims.

What is claimed is:

1. A projection system, comprising:
    circuitry communicatively coupled to an image projection sub-system that comprises illumination circuitry, wherein the circuitry is configured to:
        receive a sequence of image frames to be projected on a physical surface of a three-dimensional (3D) structure;
        control a depth sensor to acquire depth data associated with the physical surface;
        feed a first input comprising the acquired depth data and a first image frame of the received sequence of image frames to a neural network-based model;
        receive a set of geometric correction values as a first output of the neural network-based model for the fed first input;
        modify the first image frame based on the received set of geometric correction values; and
        control the illumination circuitry to project the modified first image frame onto the physical surface.

2. The projection system according to claim 1, wherein the circuitry is further configured to:
    determine first depth values associated with corners of the physical surface;
    generate virtual depth data for the physical surface based on the determined first depth values;
    compare the acquired depth data with the generated virtual depth data to generate a comparison result;
    apply a clustering method on the comparison result to divide the physical surface into surface clusters, each of which corresponds to one or more surface portions of the physical surface;
    calculate a smoothness value for each of the surface clusters;
    categorize one or more portions of the physical surface into different categories based on the calculated smoothness value; and
    determine an even surface portion of the physical surface, based on the categorization,
        wherein the modified first image frame is projected onto the determined even surface portion.

3. The projection system according to claim 1, wherein the neural network-based model comprises a convolutional neural network, and the first input, at first, is fed to the convolutional neural network.

4. The projection system according to claim 3, wherein the circuitry is further configured to:
    input the acquired depth data to the convolutional neural network;
    receive an output of the convolutional neural network for the input depth data,
        wherein the received output comprises a clustering result which is indicative of one or more even surface portions of the physical surface and one or more uneven surface portions of the physical surface; and
    determine an even surface portion of a maximum size from among that of the one or more even surface portions, wherein the even surface portion is determined based on the clustering result.

5. The projection system according to claim 4, wherein the circuitry is further configured to:
    extract coordinate values associated with corners of the determined even surface portion;
    resize the first image frame based on the extracted coordinate values; and
    modify the resized first image frame based on the received set of geometric correction values,
        wherein the modified first image frame is projected onto the determined even surface portion of the physical surface.

6. The projection system according to claim 4, wherein the modified first image frame is projected onto the determined even surface portion.

7. The projection system according to claim 4, wherein the neural network-based model further includes an artificial neural network, an input layer of which is coupled to an output layer of the convolutional neural network.

8. The projection system according to claim 7, wherein the circuitry is further configured to:
    determine a set of projection length values associated with corners of the determined even surface portion; and
    input the determined set of projection length values to the artificial neural network,
        wherein the artificial neural network generates, based on the input set of projection length values, the first output that includes the set of geometric correction values.

9. The projection system according to claim 1, wherein the modification of the first image frame includes an application of an image warping operation on the first image frame while maintaining an aspect ratio of the first image frame.

10. The projection system according to claim 1, further comprising the image projection sub-system that comprises the illumination circuitry.

11. A method, comprising:
in a projection system communicatively coupled to an image projection sub-system:
receiving a sequence of image frames to be projected on a physical surface of a three-dimensional (3D) structure;
controlling a depth sensor to acquire depth data associated with the physical surface;
feeding a first input comprising the acquired depth data and a first image frame of the received sequence of image frames to a neural network-based model;
receiving a set of geometric correction values as a first output of the neural network-based model for the fed first input;
modifying the first image frame based on the received set of geometric correction values; and
controlling illumination circuitry of the image projection sub-system to project the modified first image frame onto the physical surface.

12. The method according to claim 11, further comprising:
determining first depth values associated with corners of the physical surface;
generating virtual depth data for the physical surface based on the determined first depth values;
comparing the acquired depth data with the generated virtual depth data to generate a comparison result;
applying a clustering method on the comparison result to divide the physical surface into surface clusters, each of which corresponds to one or more surface portions of the physical surface;
calculating a smoothness value for each of the surface clusters;
categorizing one or more portions of the physical surface into different categories based on the calculated smoothness; and
determining an even surface portion of the physical surface, based on the categorization,
wherein the modified first image frame is projected onto the determined even surface portion.

13. The method according to claim 11, wherein the neural network-based model comprises a convolutional neural network, and the first input, at first, is fed to the convolutional neural network.

14. The method according to claim 13, further comprising:
inputting the acquired depth data to the convolutional neural network;
receiving an output of the convolutional neural network for the input depth data,
wherein the received output comprises a clustering result which is indicative of one or more even surface portions of the physical surface and one or more uneven surface portions of the physical surface; and determining an even surface portion of a maximum size from among that of the one or more even surface portions, wherein the even surface portion is determined based on the clustering result.

15. The method according to claim 14, wherein the modified first image frame is projected onto the determined even surface portion.

16. The method according to claim 14, further comprising:
extracting coordinate values associated with corners of the determined even surface portion;
resizing the first image frame based on the extracted coordinate values.
modifying the resized first image frame based on the received set of geometric correction values; and
projecting the modified first image frame onto the determined even surface portion of the physical surface.

17. The method according to claim 14, wherein the neural network-based model further includes an artificial neural network, an input layer of which is coupled to an output layer of the convolutional neural network.

18. The method according to claim 17, further comprising:
determining a set of projection length values associated with corners of the determined even surface portion; and
inputting the determined set of projection length values to the artificial neural network,
wherein the artificial neural network generates, based on the input set of projection length values, the first output that includes the set of geometric correction values.

19. The method according to claim 11, wherein the modification of the first image frame includes an application of an image warping operation on the first image frame while maintaining an aspect ratio of the first image frame.

20. A non-transitory computer-readable storage medium configured to store instructions that, in response to being executed, causes a projection system to perform operations, the operations comprising:
receiving a sequence of image frames to be projected on a physical surface of a three-dimensional (3D) structure;
controlling a depth sensor to acquire depth data associated with the physical surface;
feeding a first input comprising the acquired depth data and a first image frame of the received sequence of image frames to a neural network-based model;
receiving a set of geometric correction values as a first output of the neural network-based model for the fed first input;
modifying the first image frame based on the received set of geometric correction values; and
controlling illumination circuitry of an image projection sub-system communicatively coupled to the projection system, to project the modified first image frame onto the physical surface.

* * * * *